(12) United States Patent
Mignot

(10) Patent No.: US 7,042,809 B2
(45) Date of Patent: May 9, 2006

(54) METHOD AND DEVICE FOR RECOGNIZING MANUALLY TRACED CHARACTERS ON AN INPUT ZONE

(75) Inventor: Jean-Pierre Mignot, Areuse (CH)

(73) Assignee: Asulab S.A., Marin (CH)

( * ) Notice: Subject to any disclaimer, the term of this patent is extended or adjusted under 35 U.S.C. 154(b) by 338 days.

(21) Appl. No.: 10/451,534

(22) PCT Filed: Nov. 14, 2002

(86) PCT No.: PCT/CH01/00710

§ 371 (c)(1),
(2), (4) Date: Jun. 24, 2003

(87) PCT Pub. No.: WO02/052493

PCT Pub. Date: Jul. 4, 2002

(65) Prior Publication Data

US 2004/0042346 A1    Mar. 4, 2004

(30) Foreign Application Priority Data

Dec. 27, 2000   (EP)   .................................. 00204756

(51) Int. Cl.
*G06K 9/00* (2006.01)
(52) U.S. Cl. .................. 368/223; 368/84; 368/242; 382/189; 382/311
(58) Field of Classification Search ................ 368/10, 368/223, 84, 242; 382/187, 189, 785, 227, 382/229, 188, 182, 311, 315
See application file for complete search history.

(56) References Cited

U.S. PATENT DOCUMENTS 4,047,010 A    9/1977 Perotto et al.
4,199,751 A    4/1980 Piguet
4,771,268 A    9/1988 Sone et al.
5,453,960 A    9/1995 Teres et al.
5,596,656 A *  1/1997 Goldberg .................... 382/186

(Continued)

FOREIGN PATENT DOCUMENTS

EP    0 632 401 A2    1/1995

(Continued)

*Primary Examiner*—Kamand Cuneo
*Assistant Examiner*—Jeanne-Marguerite Goodwin
(74) *Attorney, Agent, or Firm*—Sughrue Mion, PLLC

(57) ABSTRACT

The invention concerns a method and an electronic device for recognizing characters traced manually on an input zone (10) comprising a plurality of sensors (15) each capable of being activated by a finger or a tracing instrument (13). The method consists in comparing the manual trace of a character (100) produced on the input zone with a group of characters of a predetermined set of characters. The invention is characterised in that each character of the set of characters is represented by at least one predetermined model representative of a way in which the character can be traced, and in that a model representative of the way in which the manual trace of the character (100) has been performed on the input zone is elaborated. The models comprise at least topological parameters representative of the topology of the character, namely, in particular: the number of strokes (A, B, C, D) used for tracing the character; the one- or two-dimensional nature of each of said strokes (A, B, C, D); and the composition of each stroke of two-dimensional nature, namely the number of segments (A1, A2, B1, B2) composing the stroke and the rectilinear or curved nature of each segment. The models further comprise, where appropriate, geometrical parameters ($\phi$, $\phi_1$, $\phi_2$, $\alpha$) representative of the evolution of the angular orientation of the trace of the segment and geometrical parameters ($P_0$, $P_1$, $P_2$) representative of the position of the stroke on the input zone.

12 Claims, 15 Drawing Sheets

U.S. PATENT DOCUMENTS

| | | |
|---|---|---|
| 5,790,698 A | 8/1998 | Nguyen |
| 5,940,535 A * | 8/1999 | Huang .................. 382/201 |
| 6,184,871 B1 | 2/2001 | Teres et al. |
| 6,366,697 B1 * | 4/2002 | Goldberg et al. ......... 382/186 |
| 6,493,464 B1 * | 12/2002 | Hawkins et al. .......... 382/189 |
| 6,816,859 B1 * | 11/2004 | Goldberg et al. ............ 707/6 |

FOREIGN PATENT DOCUMENTS

| | | |
|---|---|---|
| EP | 0 695 979 A1 | 2/1996 |
| FR | 2 538 581 A1 | 6/1984 |
| GB | 2 092 352 A1 | 8/1982 |
| WO | WO 90 15399 A1 | 12/1990 |

* cited by examiner

METHOD AND DEVICE FOR RECOGNIZING MANUALLY TRACED CHARACTERS ON AN INPUT ZONE

BACKGROUND OF THE INVENTION

The present invention relates to a method for recognising characters traced manually on an input zone and an electronic device for implementing the same.

Within the scope of the present invention, "character" means any alphanumerical character (A, B, C, . . . , 1, 2, 3 . . . ), punctuation mark (?, !, :, . . . ) or symbolic character (+, −, *, #, . . . ) capable of being traced manually by means of a finger or a tracing instrument, such as a stylus for example. By extension, it will also mean any trace other than the trace of an alphanumerical or symbolic character, with which a particular command is associated, such a trace being defined in the following description as a control character. These control characters are particularly intended to allow certain particular commands such as movement of a cursor, deletion of a previously inputted character, switching between upper and lower case letters, etc.

Various solutions allowing recognition of characters traced manually on an input zone are already known. Such solutions are particularly used for allowing manual input of data, without using a keyboard, in electronic devices, particularly portable electronic devices such as electronic diaries, pocket computers or electronic timepieces.

One solution consists in providing complex recognition algorithms based on a dot matrix or bitmap image of the traced character, which is compared to the model data of a predetermined set of characters in order to identify the character closest to the trace performed. This solution is impractical and often much too heavy and demanding in terms of computational time and power to be applied, particularly in portable electronic devices. Another drawback of this solution lies in the fact that it requires a large memory space for defining the characters to be recognised. This solution further requires learning on the part of the user so that he traces each character in accordance with a determined pattern.

Thus, the current practice is to propose recognition devices and algorithms wherein one examines the movement performed when the character is traced on the input zone. Typically, the signals emanating from the input zone, or more exactly from the plurality of sensors forming this input zone, are sampled in order to determine the history of evolution of the trace of the character.

Document No. EP 0 695 979 in the name of the Applicant discloses for example a device for identifying a character traced on a surface as well as a process for identifying such a character, particularly for a watch. According to this document, a series of identifiers representative of changes of state ("ON" or "OFF") in the sensors forming the input zone is produced and compared to at least one series of reference identifiers in order to identify the traced character.

Given the complexity and the strong similarity of certain characters, the current practice is to adopt certain simplifications in the set of characters (for example breaking down the characters into different sets of alphabetic characters, numerical characters, symbolic characters, etc., particularly in order to avoid confusion between certain characters such as "O" and "0", "B" and "8", "+" and "T", etc.) and to force the user to trace the characters in accordance with well determined sequences which are sometimes contrary to his normal practice or even any normal practice. Thus, with the existing solutions, there is often only one possible way of tracing each character so that it is not confused with others. Moreover, the sequences which have to be adopted do not necessarily correspond to the natural trace of the desired character. These difficulties are even greater, given that handwriting characteristics are greatly variable and even completely opposite, for example between the handwriting of a right-handed person and a left-handed person.

Other examples of character recognition devices with similar constraints are also disclosed in document Nos. U.S. Pat. No. 4,047,010 A, U.S. Pat. No. 4,199,751 A, GB 2,092,352 A and WO 90/15399.

These known recognition devices and algorithms thus require learning on the part of the user or involve constraints for the user. If this learning is imperfect or if the constraints are not followed, errors can appear when the desired text is inputted, which errors extend the time necessary for data input.

Another solution is disclosed in document No. FR 2,538, 581. According to this other solution, each stroke performed when a character is traced on the input zone is broken down into a plurality of rectilinear segments and the orientation of each of these segments is determined with respect to a plurality of reference vectors (eight in number). A model of the traced character formed of a determined set of rectilinear segments is thus elaborated then compared to a corresponding set of reference characters. According to document No. FR 2,538,581, this solution is advantageously implemented in a portable object of similar style to a wristwatch.

Document No. EP 0 632 401 proposes modelling each character, not only on the basis of models formed of rectilinear segments, but also on the basis of models taking account of other parameters such as the movement up ("PEN UP") or down ("PEN DOWN") of the writing instrument on the input zone, the duration of a pause during tracing, the centre of gravity of the trace, the size of the trace, the rotational direction of a curved segment, the position of the start and end points of a curved segment and the orientation of such a curved segment. This latter document teaches that such a solution is implemented in a parallel processor system using a specific memory type called "associative" memory. Such a parallel processor structure is of course inconceivable for application to portable electronic devices where the data processing capabilities, in particular, are limited.

It will be noted that the solutions proposed in document No. FR 2,538,581 and document No. EP 0 632 401 both rely on geometrical considerations to allow character recognition. This is a major drawback in the sense that it is not practical to model all the possible variants of a given written character by geometrical parameters. Indeed, handwriting can vary greatly from one person to another or even for a single person. Given their great variability, parameters such as the orientation, size, position, length or other geometrical parameters of the trace of the character, can thus not be used to allow truly reliable and robust character recognition.

SUMMARY OF THE INVENTION

It is a first object of the present invention to propose a solution that does not require any learning, so to speak, on the part of the user, namely a solution that is capable of recognising characters traced by the user without the latter having to substantially change his normal practice.

It is another object of the present invention to propose a solution, which is capable of recognising alphanumerical characters, symbolic characters, control characters or other characters, traced in various ways by the user.

It is yet another object of the present invention to propose a solution which is not, however, too complex, nor too demanding to implement, such that it can be applied in electronic devices of small volume, such as electronic diaries, pocket computers, timepieces, portable telephones, remote controls, or any other portable electronic device of small size, particularly battery-powered portable electronic devices.

It is yet another object of the present invention to limit the number of errors in interpreting the traced character, i.e. to propose a solution which is capable of rejecting certain traces of characters which do not correspond in any way to a predetermined character.

The present invention thus concerns a method for recognising characters traced manually on an input zone of an electronic device whose features are listed in independent claim 1.

Advantageous implementations of this method form the subject of the dependent claims.

The present invention also concerns an electronic device for implementing the method according to the invention whose features are listed in independent claim 10.

Advantageous embodiments of this device form the subject of the dependent claims.

One advantage of the present invention lies in the fact that the characters are not modelled as characters as such, but each character is defined by at least one predetermined model representative of the manner in which the character can be traced. Likewise, the character traced manually by the user on the input zone is represented by a model representative of the manner in which the character has been traced. Typically, a character will be defined by more than one model in order to take account of the various ways in which it can be traced manually.

More particularly, according to the invention, the models comprise at least topological parameters concerning the topology of the character, namely, in particular:

the number of strokes used to trace the character;
the nature of each of said strokes, namely whether it is a stroke of one-dimensional nature (a dot) or of two-dimensional nature (one or more segments); and
the composition of each stroke of two-dimensional nature, namely:
the number of segments forming the stroke of two-dimensional nature; and
the nature of each segment, namely whether it is a segment of rectilinear or curved nature.

Advantageously, the topological parameters can be completed by an indication concerning the "closed" nature (for example characters "B", "D", "O", "8", "0", etc.) or "open" nature (for example characters "A", "C", "E", etc.) of a stroke of the trace of the character.

Within the scope of the present description, "topology" means all the features of a character independent of the size and exact dimensions of the character, i.e. independently of the exact geometry of the character. In particular, within the scope of the present invention, this will mean the number of strokes used to trace the character as well as the nature and, if appropriate, the composition of each of said strokes as mentioned hereinbefore. It will also means other parameters such as the rotational direction of a curved segment as mentioned hereinafter.

Within the scope of the present description, "stroke" means the trace performed by the finger or tracing instrument on the input zone from the start until it is interrupted, each character being able to be traced in a variable number of strokes, typically less than or equal to four in the case of an alphanumerical or symbolic character of a set of Latin characters.

"Segment" means a portion of a stroke which is distinguished from another segment of the stroke by its rectilinear or curved nature and/or by a significant change of direction adopted by the finger or tracing instrument during execution of the stroke in question.

The models further include, as appropriate, for each segment of rectilinear or curved nature, geometrical parameters representative of the evolution of the angular orientation of the trace of the segment . Preferably, the geometrical parameters representative of the evolution of the angular orientation of the trace of the segment include:

for each segment of rectilinear nature, the angular orientation (designated $\phi$) of the segment; or
for each segment of curved nature, the beginning or end angular orientation (respectively designated $\phi_1$, $\phi_2$) at one end of the segment (whose positions are respectively designated $P_1$, $P_2$).

It should be specified that "angular orientation" means the orientation and direction of a rectilinear segment, or a tangent of a curved segment taken at one point of this curved segment, indicated by an angle value, as is schematically illustrated in FIGS. 12 and 13a to 13c. In the following description, solely for the purposes of explanation, the angular orientation of a segment or of a tangent will preferably be defined as being comprised between the values −180° and 180°. It will be understood however that these values are defined to within n360° (n being an integer number), −180° and 180° thus designating the same angular orientation.

It should be specified here that the start or end angular orientation corresponds to the angular orientation of the tangent at one end of the curved segment, this tangent being defined, at least, by the first two samples, respectively, the last two samples, of the trace of the segment in question. In practice, a mean value over several successive samples of the trace of the curved segment at the start, respectively at the end, will be used to determine a value of this start or end angular orientation.

In the aforementioned case, the parameters concerning the topology of the character further include, for each curved segment, the rotational direction (designated w) of the segment, this rotational direction being at least trigonometric (anticlockwise) or non-trigonometric (clockwise).

In such a case, it may also be useful to define, in addition to the trigonometric or non-trigonometric rotational directions, a third so-called mixed or variable rotational direction, i.e. a rotational direction which varies between the trigonometric and the non-trigonometric rotational directions such a feature being for example present in certain traces of characters, such as the traces of characters "N", "M", "W", "S", "2", "5", "8", etc. Alternatively, it is clear that such a curved segment of mixed rotational direction could be divided into a plurality of curved segments of trigonometric or non-trigonometric rotational direction.

The geometrical parameters representative of the evolution of the angular orientation of the segment can also advantageously include, for a curved segment, the total development angle (designated $\alpha$) of the curved segment. In the case of a curved segment of mixed rotational direction, this total development angle will preferably be defined as being the sum, in absolute value, of the total development angles of each portion of trigonometric or non-trigonometric rotational direction. The total development angle a simplifies identification of certain particular characters.

In addition to the geometrical parameters representative of the evolution of the angular orientation of the trace of the character, each model further includes geometrical parameters representative of the position of each stroke on the input zone, in particular and advantageously, the position of each stroke of one-dimensional nature (dot) or the position of the ends of each stroke of two-dimensional nature. Advantageously, these geometrical parameters can be completed by the position of the ends of each segment composing a stroke of two-dimensional nature.

It is clear that the position of a stroke of one-dimensional nature or the ends of a stroke of two-dimensional nature can be defined with respect to the input zone on which the stroke is performed or, alternatively, with respect to the trace of the character concerned. Generally, within the scope of the present invention, we will essentially use relative position indications with respect to the trace of the character, i.e. position indications for defining whether such and such a stroke is located in a high or low, and/or left of right part of the trace of the character. Exceptionally, for certain characters (for example "/", ",", and """) we will use relative position indications with respect to the input zone on which the stroke was traced to differentiate characters whose traces differ only in their position on the input zone.

It is also clear that not all the models necessarily require geometrical definition of their features. Thus certain characters can only be defined in an unequivocal manner by means of topological parameters.

FIGS. 11, 12, 13a, 13b and 13c illustrate schematically the above definitions. In particular, FIG. 11 is an illustration of a one-dimensional stroke, i.e. a dot, defined by its position $P_0$. FIG. 12 is an illustration of a segment of rectilinear nature defined by its angular orientation $\phi$ and the positions $P_1$, $P_2$ of its ends. FIGS. 13a, 13b and 13c are illustrations of segments of curved nature each defined by the start and end angular orientations $\phi_1$ $\phi_2$ at the ends of the segment, the positions $P_1$, $P_2$ of the ends, and the respectively non-trigonometric, trigonometric and mixed rotational direction w in FIGS. 13a to 13c.

In FIGS. 13a, 13b and 13c, the total angle of development a of each curved segment has also been indicated. In FIG. 13c, it will be noted that the total angle of development a is defined, in this case, as the absolute value of the sum of the total angles of development, designated $\alpha_1$, $\alpha_2$, of the trigonometric and non-trigonometric portions of the curved segment.

By way of example, a vertical rectilinear segment traced from top to bottom will be defined as having an angular orientation $\phi$ of $-90°$, whereas a vertical rectilinear segment traced from bottom to top will be defined as having an angular orientation $\phi$ of $+90°$. A rectilinear segment traced from left to right will be defined as having an angular orientation of $0°$ and a rectilinear segment traced from right to left will be defined as having an angular orientation of $\pm 180°$. As already mentioned, these angular orientations are defined to within n360°.

Likewise, a curved segment representing a "C" traced from top to bottom or from bottom to top (rotational direction w being trigonometric or non-trigonometric) will be, solely by way of example, defined as having a start angular orientation $\phi_1$ of approximately $\pm 180°$ and an end angular orientation $\phi_2$ of approximately $0°$ (total development angle $\alpha$ is 180°). These two curved segments differ only in their rotational direction.

During analysis of the trace performed manually on the input zone, the angular orientation of each segment will preferably be "developed" in order to prevent the interruption at $\pm 180°$ taking account of the definition used and the 360° periodicity of the notion of angle. Let us take, by way of example, a curved trace similar to the trace of the character "C", performed in the trigonometric direction (from top to bottom) and having a start angular orientation of around 170° and an end angular orientation of around 0°, the angular orientation of the segment will be developed from 170° to 360° (the total angle of development $\alpha$ is 190°). In the case of a similar curved trace, starting for example with an angular orientation of $-170°$ and ending in an angular orientation of 0°, the angular orientation of the segment will be developed from $-170°$ to 0° (the total angle of development $\alpha$ here is 170°), etc.

By comparing the angular orientations of these two examples of traces with a model of character "C" having a rotational direction w of the trigonometric type and defined as having start and end angular orientations of $\pm 180°$ and 0° respectively, one will end up with a deviation, in terms of angular orientation, of 10° for the two examples taking account of the periodicity of 360°.

A curved segment representing the character "S" traced from top to bottom could for example be defined as having start and end angular orientations $\phi_1$ and $\phi_2$ substantially equal to $\pm 180°$ and a mixed or variable rotational direction (the total angle of development $\alpha$ is, in absolute value, $180°+180°=360°$ approximately). Alternatively, as already mentioned, this curved segment could be broken down into two successive curved segments of respectively trigonometric and non-trigonometric rotational direction (each having a total angle of development $\alpha$ of 180°).

According to the invention, the use of topological criteria, i.e. criteria independent of the exact shape and dimensions of the character, enable sorting and significant pre-selection of candidates likely to correspond to the traced character, without it being necessary to rely, at this stage, on considerations of geometric order. Indeed, the simple fact of examining the number as well as the nature and composition of the strokes used to trace the character already greatly restricts the extent of research necessary to identify the traced character. The differentiation between rectilinear and curved segments allows the pre-selection of candidates to be refined. It is even possible, in certain cases, to identify the traced character in an unequivocal manner on the basis only of these topological criteria. As will be seen in detail hereinafter, this possibility is used, in particular, in order to identify certain specific control characters.

The geometric criteria, namely the angular orientation(s) of a segment, and where appropriate, the position of a dot or of a segment are only applied subsequently in order to eliminate the invalid candidates. In particular, according to the invention, the angular orientations of the segments forming the traced character are preferably compared first of all with the angular orientations of the segments of the candidates and the most similar candidate(s) are selected on this basis. If this selection ends with a set of several candidates, the stroke position data (namely the position of a one-dimensional stroke and/or the position of at least one dot representative of a two-dimensional stroke) of the traced character are then used to identify the best candidate.

Owing to the invention, it is thus possible to model a large number of characters (at least 80 characters not counting the lower case letters) and a large number of variants of traces for the same character, the learning on the part of the user being thus limited and the use of the device implementing this method facilitated. The recognition rate resulting from implementation of the recognition method according to the present invention is moreover very high and the risk of inputting erroneous data is thus limited. It is also very easy to add new models, the approach used being applicable whatever the number or complexity of the defined models.

Yet another advantage of the present invention is that it allows handwriting features peculiar to a right-handed and/ or left-handed person to be taken into account.

BRIEF DESCRIPTION OF THE DRAWINGS

Other features and advantages of the present invention will appear more clearly upon reading the following detailed description, made with reference to the annexed drawings, given by way of non-limiting examples and in which.

DETAILED DESCRIPTION OF THE INVENTION

The recognition device according to the present invention will be described within the scope of a particular application, namely an application in a timepiece. It will be understood, however, that the invention equally applies to any other electronic device in which one wishes to input data by means of a finger or a tracing instrument. It will also be understood that the nature and composition of the input zone of the recognition device are not determinant. Thus, although the input zone is defined within the scope of the present description as including capacitive type sensors, it will easily be understood that any other type of sensor can be used, such as optical, ohmic, inductive sensors, surface acoustic wave propagation sensors (SAW) or any other type of sensor capable of being activated by a finger or a tracing instrument so as to produce a signal able to be used to extract topology and geometrical data about the trace performed on the input zone.

Figure 1:
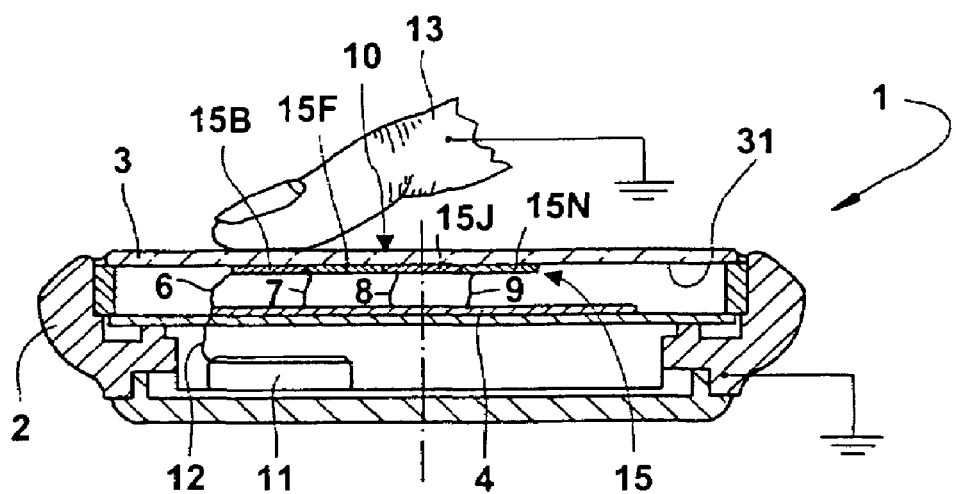
FIG. 1 is a schematic cross-sectional view of a timepiece comprising a character recognition device according to the present invention.

FIG. 1 shows a cross-sectional view of a timepiece 1 including a case 2 and a glass 3. An electronic circuit 4 is arranged in case 2. Conductive electrodes, that are preferably transparent, are arranged on the inner face 31 of glass 3, only four of these electrodes, respectively referenced 15B, 15F, 15J and 15N, having been shown in FIG. 1. As already mentioned, this sensor arrangement is in no way limiting.

Conductors 6, 7, 8 and 9 respectively connect conductive electrodes 15B, 15F, 15J and 15N to electronic circuit 4. A battery 11 or other electric energy source (such as a rechargeable accumulator) is also arranged in case 2 and is connected to a supply terminal of electronic circuit 4 by a conductor 12.

Each of conductive electrodes 15B, 15F, 15J, 15N (15A to 15P in FIG. 2) forms one of the terminals of a series of capacitive sensors, designated globally by the reference 15, the other terminal of each of these capacitive sensors 15 being essentially formed by the finger 13 of the person using timepiece 1 when he touches the outer face of glass 3 opposite a particular electrode. These capacitive sensors 15 together form an input zone 10 allowing data input, here by means of the user's finger 13. This finger 13 is connected to the ground of electronic circuit 4 via case 2, which is in contact with the user's wrist, said ground typically being connected to the negative terminal of battery 11 and to electronic circuit 4.

Figure 2:
FIG. 2 shows a spatial arrangement of sensors forming an input zone of the character recognition device.

FIG. 2 shows a plan view of an example spatial arrangement of capacitive sensors 15 comprising the conductive electrodes referenced 15A to 15P and forming input zone 10 of the recognition device. This input zone 10 includes in this example a plurality of sensors 15, in this case sixteen in number, arranged in the form of a four by four matrix as illustrated.

It will also be noted that a stray capacitance is, by construction, present between each of conductive electrodes 15A to 15P and case 2 of timepiece 1. Each of capacitive sensors 15, of which the conductive electrodes form part, and the stray capacitance associated with the capacitive sensor are connected in parallel between ground and an input of electronic circuit 4.

Detection means of electronic circuit 4, suited for use with capacitive sensors, will now be described, these detection means being described purely by way of non-limiting illustration.

Reference can be made to Patent document Nos. EP 0 674 247 and EP 0 838 737, also in the name of the Applicant, and to Patent document No. EP 0 695 979 already mentioned in the preamble, and which are all three incorporated herein by reference, to obtain detailed information as to the making of electronic circuit 4. One will simply say here that each capacitive sensor, and the stray capacitance present in parallel, is connected to the input of a voltage-controlled oscillator, the frequency of this oscillator varying as a function of the total capacitance present between its input and ground. It will be noted that each capacitive sensor can be connected to its own voltage controlled oscillator or, alternatively, all be connected to a single voltage controlled oscillator via a multiplexer. The use of a multiplexer of course requires a multiplexing period of substantially short duration less than the movement of the finger or tracing instrument on the input zone and than the signal sampling period, such that the signals emanating from each sensor are considered, at a given instant, as being simultaneous measurements of the state of the sensors.

More particularly, the oscillation frequency of the signal produced at the voltage controlled oscillator output is proportional to the inverse of the total capacity of the two parallel connected capacitors. Thus, if finger 13 of the user of timepiece 1 is not placed on glass 3 facing a particular electrode, one of the terminals of the corresponding capacitive sensor is consequently not formed. In this case, the total capacitance present between the oscillator input and ground is equivalent to the stray capacitance value, and the oscillation frequency of the output signal of the voltage controlled oscillator is proportional to the inverse thereof.

Conversely, when finger 13 is placed on glass 3 facing a particular electrode, the total capacitance is affected by the presence of this finger. Consequently, the oscillation frequency of the output signal of the voltage-controlled oscillator is proportional to the inverse of the sum of the capacitances. It will further be noted that the frequency variation caused by the presence of finger 13 is dependent on the surface of the electrode covered by finger 13. Thus, one can detect not only the presence or absence of finger 13 facing the electrodes, but also the degree of coverage of the electrodes are covered by finger 13.

The desired data in the output signal is contained in the frequency of the signal produced by the voltage-controlled oscillator. Thus, one need only use digital means simply designed to extract such data. One can thus, for example, account for the number of zero crossings of the output signal during a determined period (or alternatively the number of pulses) to extract the required data from the various sensors.

It will be understood that one can omit examination of the frequency variation as a function of the degree of coverage of the sensors and simply examine the state of activity or inactivity of each sensor provided that the input zone resolution, i.e. the number of sensors, is sufficient to obtain a sufficiently precise image of the manual trace performed on the input zone. The input zone resolution also depends on the tracing tool used and its contact surface with the input zone, the contact zone of a finger obviously being larger than that of a stylus for example. The arrangement illustrated in FIG. 2 (and in FIG. 5) is particularly suited to allow the use of a finger as tracing tool, each sensor having a surface of the order of 1 cm² which is less than the size of the typical contact surface of a finger.

As a complement, it would be advantageous to provide the timepiece or, more generally, the electronic device incorporating the recognition device according to the present invention, with display means (not shown in FIG. 1) for providing the user with an indication of the trace that he has performed on input zone 10. Such display means, formed for example of a liquid crystal display, can advantageously be arranged in the timepiece of FIG. 1 so as to facilitate use of the recognition device, the user benefiting from confirmation data that is directly visible facing input zone 10.

Figure 3:
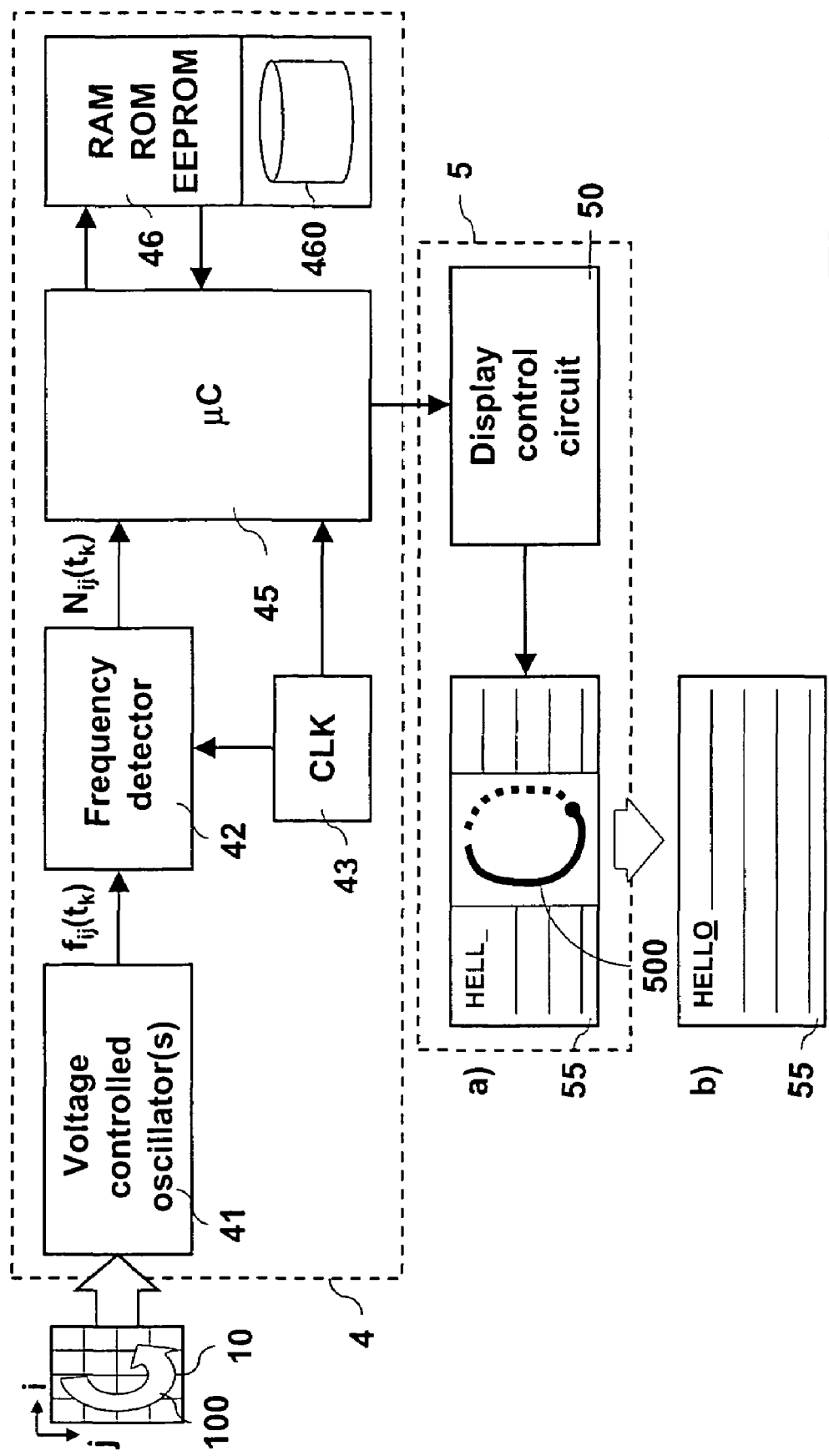
FIG. 3 shows a block diagram of a character recognition device according to the present invention using, in a non-limiting manner, a network of capacitive sensors, as illustrated in FIG. 2.

FIG. 3 shows a particular block diagram of a character recognition device according to the present invention using an array of capacitive sensors. This diagram is only illustrative. Input zone 10 and electronic circuit 4 associated with said input zone 10 have been shown schematically in FIG. 3. Display means, indicated globally by reference numeral 5, are also shown, which display means comprise in particular a display control circuit 50 and a display device 55, such as a liquid crystal display, the latter typically taking the form of a dot matrix display for displaying a plurality of lines of characters and, if appropriate, displaying an image of the manual trace performed on input zone 10.

Input zone 10 and its capacitive sensors are connected to one (by multiplexing) or more voltage controlled oscillators 41 delivering at output, at a given instant designated $t_k$, frequency signals $f_{ij}(t_k)$, the indices i and j being indicative of the position of the sensor in the array forming input zone 10. A frequency detector 42 connected to the output of the voltage controlled oscillator(s) 41 determines the frequency of the signal produced for each sensor, for example by determining the number of zero crossings of said signal during a determined measurement period, this number, for each sensor, being indicated by the reference $N_{ij}(t_k)$. Frequency detector 42 typically receives a clock signal produced by clock means 43 and defining the measurement period for determining the frequency of the signals produced for each sensor. These same clock means 43 produce a second clock signal determining the sampling frequency of the signals produced by the sensors of input zone 10 when the character is being traced.

The number $N_{ij}(t_k)$ representative of the frequency of the signal produced for each sensor of input zone 10 at instant $t_k$ is transmitted to a microcontroller 45 responsible for processing the acquisition signals of the trace of the character and recognising the character. For this purpose, microcontroller 45 exploits data stored in storage means 46 typically comprising a volatile memory (RAM), a read-only memory (ROM), and/or a reprogrammable memory (EE-PROM). The data exploited by microcontroller 45 include, in particular, data relating to the various models of alphanumerical, symbolic and control characters, this data being stored in the form of a character library 460 as schematically illustrated in FIG. 3.

The input of an alphanumerical text (in this example input of the term "HELLO") has also been illustrated. Advantageously, each character is successively inputted by means of input zone 10 and recognised by microcontroller 45 in accordance with a process that will be amply described hereinafter. During tracing of the character on the input zone, the manual trace of the character, designated 100, performed on input zone 10 (here the character "O") is preferably displayed on display 55 (as illustrated at a)), in order to offer the user confirmation of the performed trace. At the end of the recognition process, the character is validated (or rejected as appropriate) and displayed on display device 55 as illustrated at b) in FIG. 3.

The operation of the character recognition device will now be described in more detail with reference to FIGS. 4 to 10.

FIGS. 4a to 4d illustrate schematically and partially a set of models representative of various ways in which various alphanumerical, symbolic and control characters can typically be traced on input zone 10 within the scope of the present invention. It will be stressed that the set illustrated is in no way exhausting or limiting and that other traces can easily be envisaged. Thus, particularly, the trace of numerous alphabetic characters, such as the letters "B", "D", "E", "F", "M", "N", "P" or "R", can begin with a first vertical segment traced from top to bottom as shown schematically by the vertical segment directed downwards indicated in brackets and shown facing each of these characters.

Figure 4A:
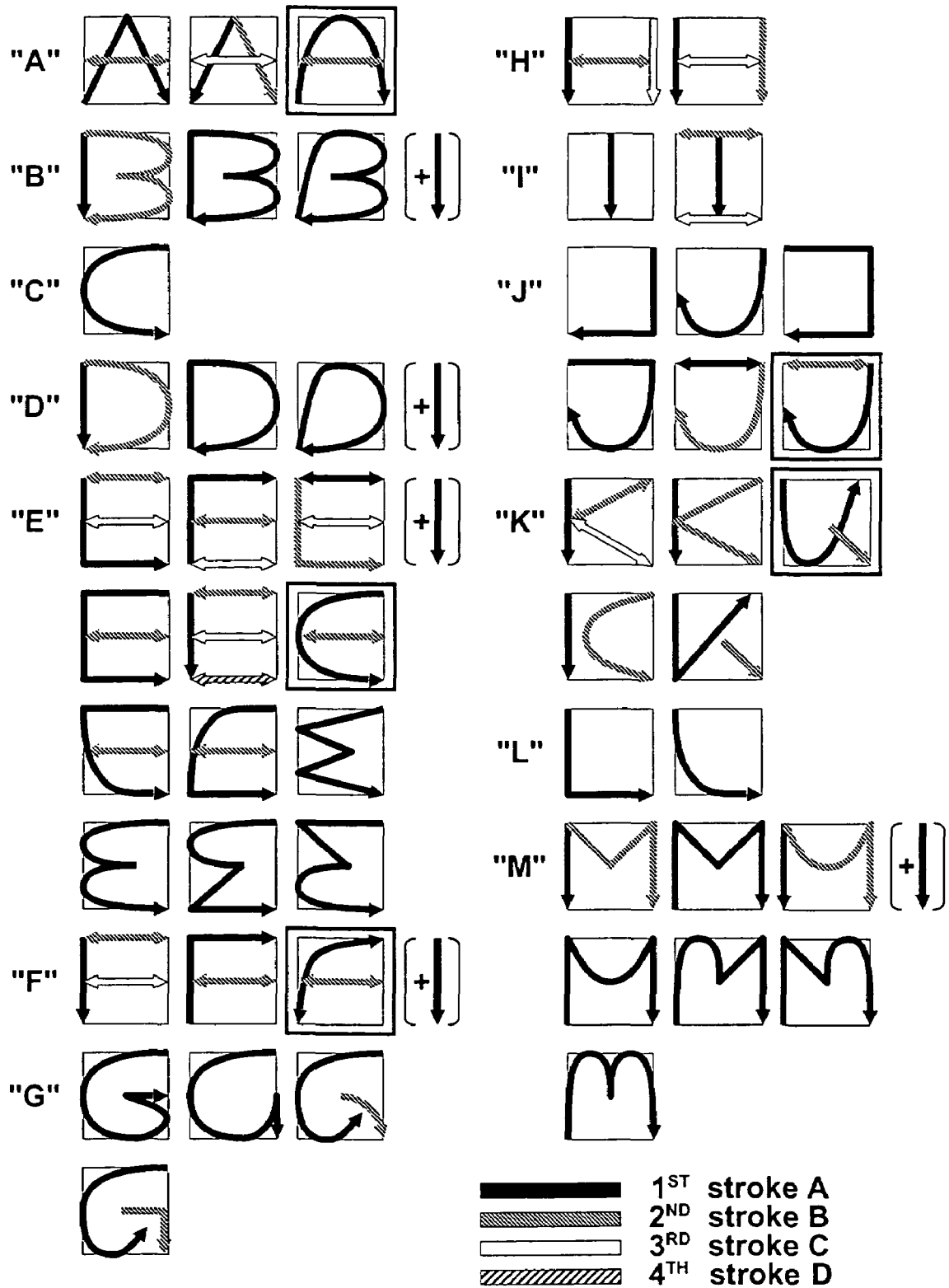
FIGS. 4a to 4d illustrate in a non-exhaustive manner, a set of models of alphanumerical characters, symbolic characters and control characters able to be defined within the scope of the present invention.
Figure 4B:
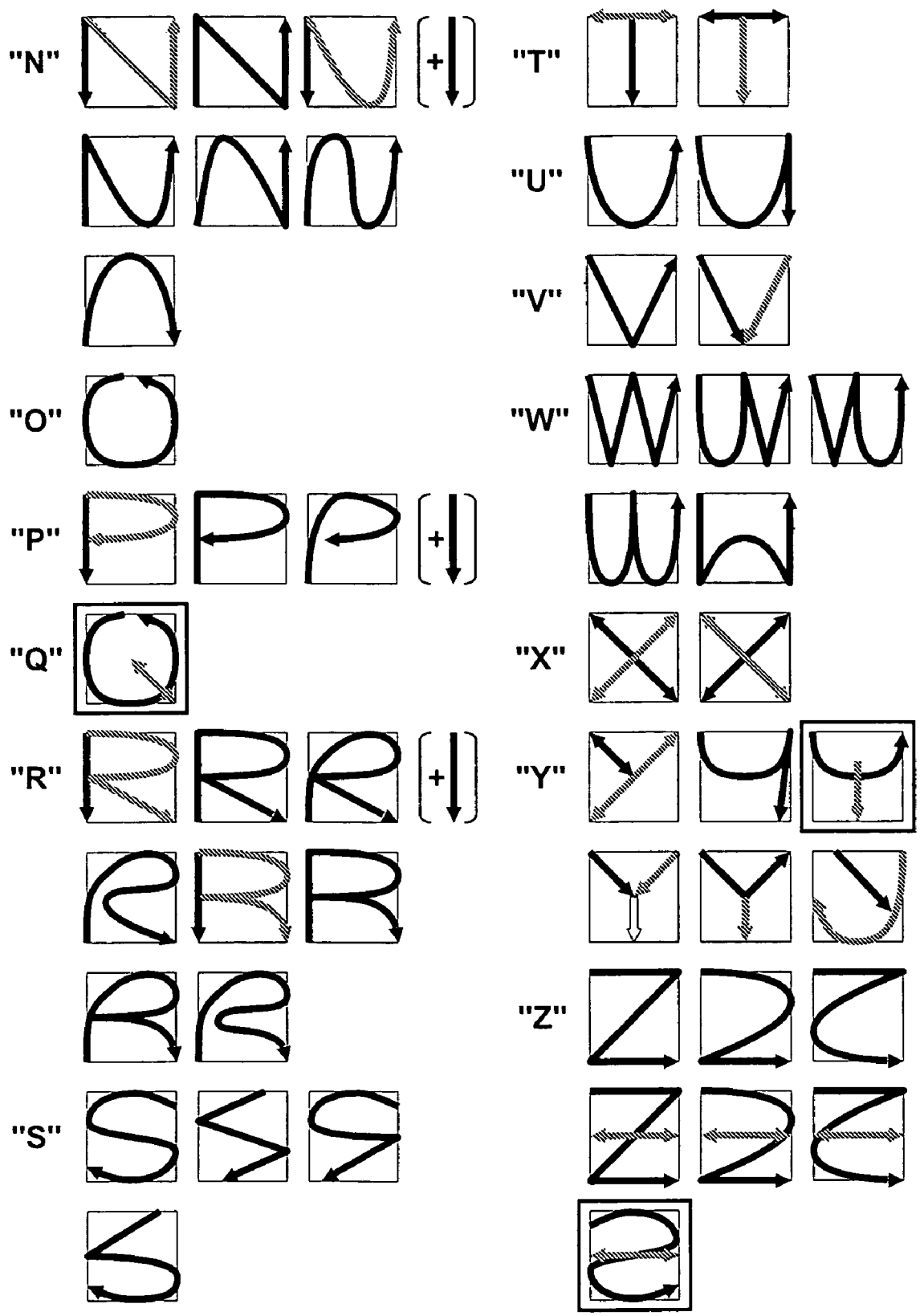
Figure 4C:
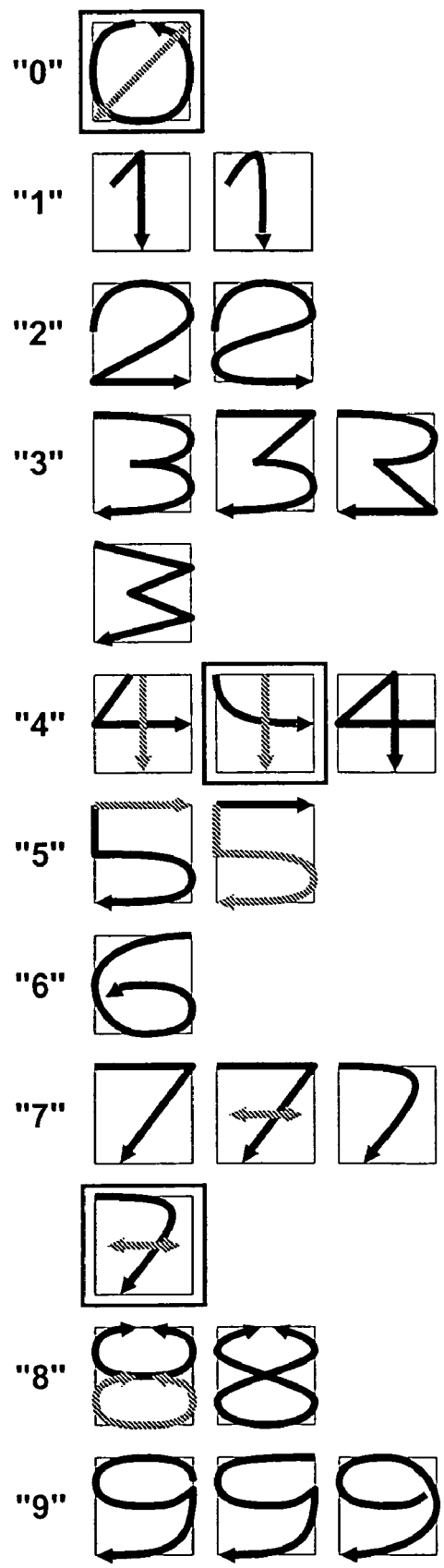
Figure 4C:
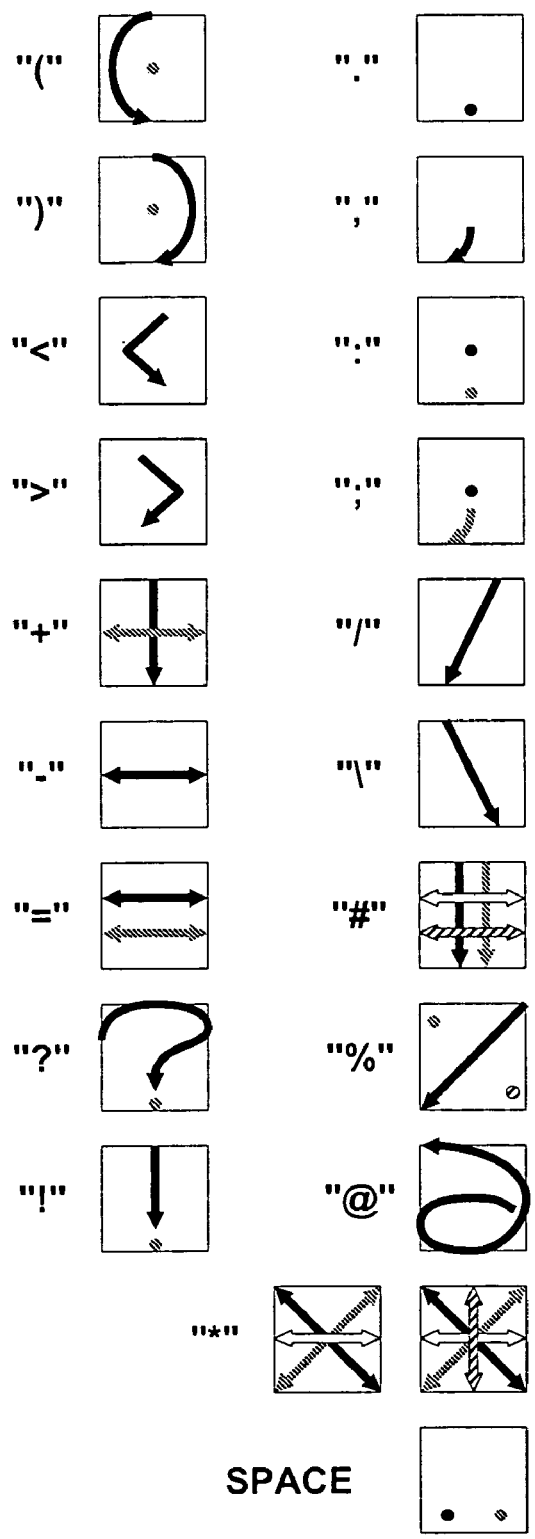
Figure 4D:
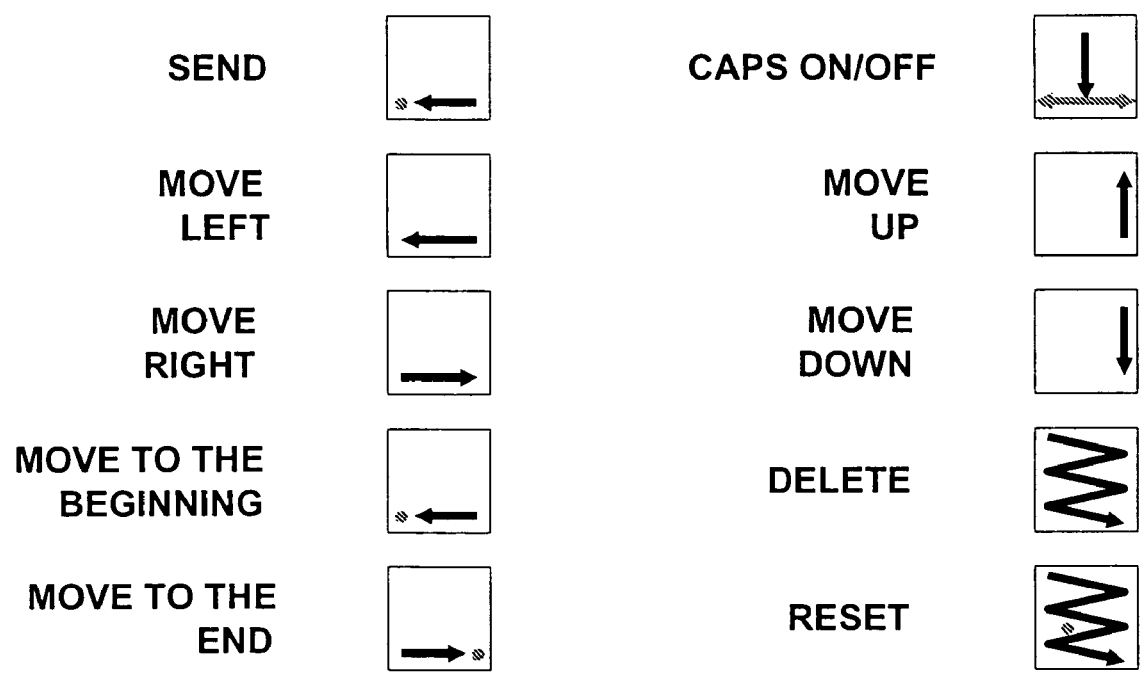

FIGS. 4a and 4b illustrate in particular models of alphabetical characters, FIG. 4c models of numerical and symbolic characters and FIG. 4d possible models of control characters. In all of these Figures, the different strokes, designated A to D, necessary to trace the character are illustrated by different colours or different patterns. In particular, the first stroke A is shown in black, second stroke B in grey, third stroke C in white and the fourth stroke D in hatching as is indicated in the legend of FIG. 4a. The arrow in each stroke indicates the direction in which the stroke is traced, two opposite arrows indicating that the stroke in question can be traced indifferently in one direction or the other.

Upon examining the set of characters illustrated in FIGS. 4a to 4d, one will note the very reduced number of characters requiring learning or certain constraints for the user. For instance, the open and closed brackets "(" and ")" are modelled with an additional stroke of one-dimensional nature and the character "SPACE" is modelled by two strokes of one-dimensional nature performed at substantially the same height. For the remainder, the characters are modelled as close as possible to their typical natural trace(s).

Generally, it is to be noted that most of the characters are performed, in this example, in one, two, three, or even four strokes. The character "E" and the symbolic characters "#" and "*" can be traced, for example in four strokes each formed of a rectilinear segment. In this regard, if only topological criteria are firstly taken into account, the characters "E", "#" and "*" have, all three, a similar topological definition, i.e. a set of four strokes each formed of a single rectilinear segment. Their differentiation requires the comparison of the angular orientations of the rectilinear segments, one of the features of the character "E" with respect to the characters "#" and "*" being the presence of three horizontal rectilinear segments.

According to the present invention, the various models will preferably first be grouped according to the number of strokes. Each of these categories is then broken down according to the nature and composition of the strokes. In the case of a one-dimensional stroke (a dot), the model preferably also includes geometrical parameters concerning the position of this one-dimensional stroke. In the case of a two-dimensional stroke (one or more segments), the model preferably also includes geometrical parameters concerning the angular orientation(s) of each segment, and, for each curved segment, at least one topological parameter relating to the direction of rotation of the curved segment (trigonometric or non-trigonometric, or mixed). A tree structure is thus formed, which allows to end up with a particular model of a character.

Beyond a determined number of strokes one can typically assume that the trace performed by the user on the input zone does not correspond to an alphanumerical, symbolic or control character, but corresponds to an undefined character. For example, there are typically no characters, in the Latin set of characters, which are naturally performed within more than four strokes. Likewise, it can be assumed that the trace of a character comprising a stroke formed of a number of segments higher than a determined limit corresponds to an undefined character or, advantageously, to a specific control character. It is, for example, possible to define a certain number of specific control characters having an unequivocal topological definition, i.e. characters that do not require geometrical parameters to be recognised. Thus, one can for example advantageously define a first specific control character by a model formed, for example, of a single stroke including more than five successive segments, or a second specific control character by a first stroke including more than five successive segments followed by a second stroke including a dot as illustrated in the right part of FIG. 4d.

According to the invention, the distinction is advantageously made between the one-or two-dimensional nature of each stroke. A dot could then quickly be differentiated from a segment or several successive (rectilinear or curved) segments if a very localised trace contained in a zone of reduced size is detected. To a certain extent, the field of research of a traced character can quickly be reduced as soon as a stroke recognised as corresponding to a dot appears, this feature being present only in a reduced number of characters, the latter essentially being punctuation marks, symbolic characters or control characters.

Likewise, via differentiation between a segment of rectilinear or curved nature, the field of research can quickly be reduced by selecting only those models possessing similar features. This selection can be further refined by taking account, if appropriate, of the rotational direction of each curved segment, provided that the traced character includes a segment of such nature.

The efficiency of the approach proposed according to the present invention will easily be observed. Indeed, the topological criteria allow all the characters to be efficiently modelled with a reduced number of data, often in an unequivocal manner. As will be seen hereinafter, the geometrical parameters of the evolution of the angular orientation and, if appropriate, of position are only used lastly to differentiate the remaining candidates.

A first aspect of the invention thus requires forming a catalogue or set of models for each character capable of being traced by the user, each model being representative of at least one way of tracing the character in question, such a set being, for example, illustrated in FIGS. 4a to 4d. It will be noted that more than one set of characters can be defined. Thus, one can envisage creating distinct sets of characters for the alphabetical, numerical and symbolic characters for example in order to reduce the risk of interpretation errors between characters with a similar topology.

According to another aspect of the invention, it is also necessary to process the signals produced by the various sensors forming the input zone in order to extract data for forming a model of the traced character that also includes data or parameters concerning its topology and geometry. This character is thus typically sampled during the entire period necessary for it to be traced.

Figure 5:
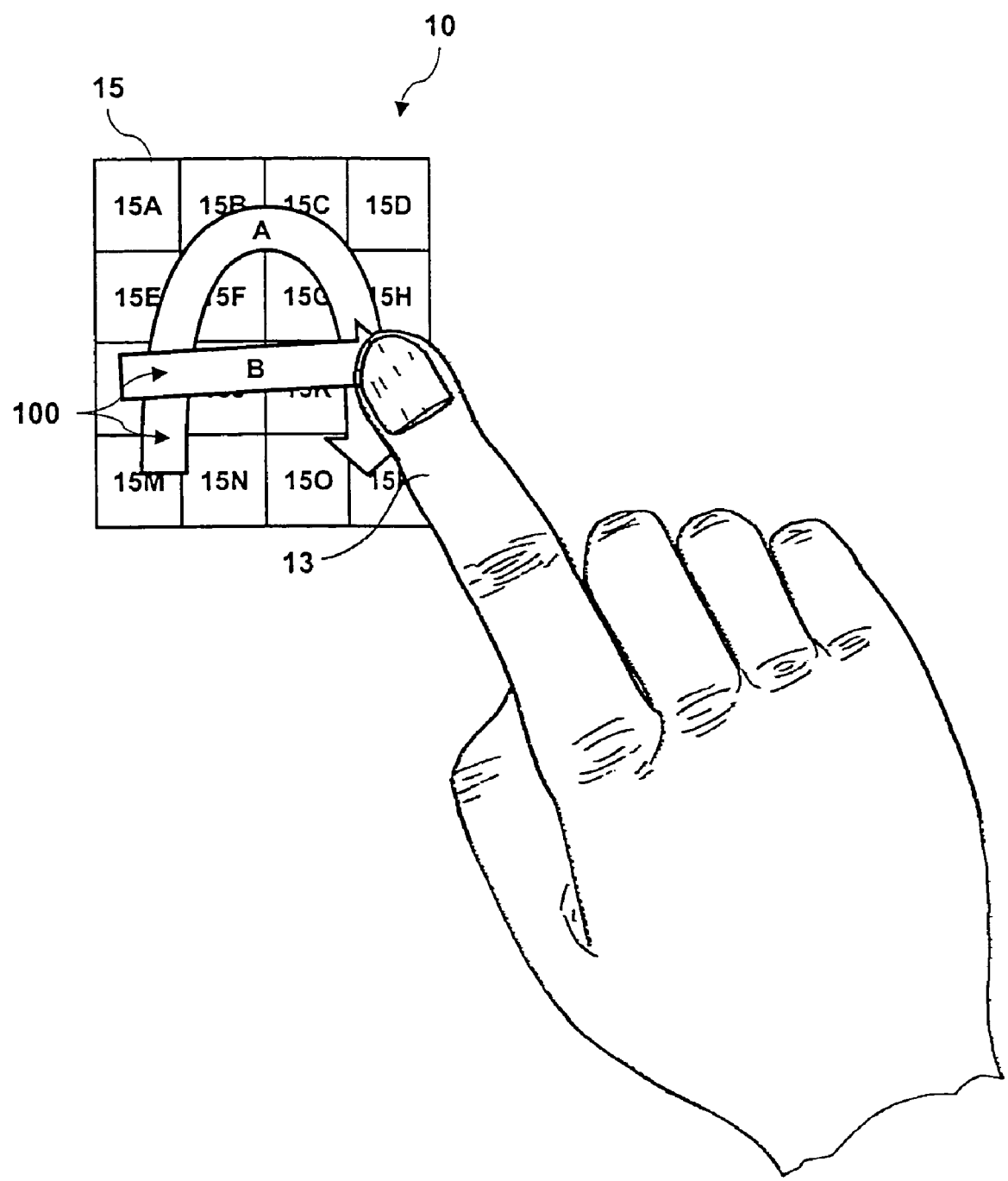
FIG. 5 illustrates a possible trace of the character "A" on the input zone of FIG. 2.

FIG. 5 shows the arrangement of the sensors of FIG. 2 in which, by way of example, the manual trace, designated 100, performed by finger 13 representing the character "A" has been symbolised by two arrows. By following this trace, it will be observed, for example, that finger 13 has first of all performed a first stroke, designated A, to make a first part of the character, i.e. the concave-shaped part of the character "A" (here in the shape of a curved inverted U segment), then a second stroke, designated B, to make the trace of the substantially horizontal bar of the character "A". This example corresponds to a natural and typical trace of the character "A" by a right-handed person. It will be noted, however, that this same character can be traced in other ways, for example in a first stroke taking the shape of an inverted V then a second stroke formed of a horizontal rectilinear segment, or in three strokes as illustrated in FIG. 4a.

Depending upon the type of input zone and the number and nature of sensors forming this input zone, it may or may not be necessary to carry out prior processing of the signal before extracting the data necessary for recognition. In the non-limiting example used in an illustrative manner within the scope of the present description, the input zone is formed of a four-by-four matrix of discrete capacitive sensors each connected to a voltage controlled oscillator (as described hereinbefore) and producing an electric signal whose frequency varies as a function of the degree of coverage of each sensor by the finger. In the example illustrated in FIG. 5, taking account of the size of the sensors, one obviously cannot simply examine only whether each sensor is activated or not. One will thus preferably use the dependence of the frequency of the output signal with regard to the degree of coverage of the sensors by the finger to determine more precisely the position of the finger on the input zone.

Typically, taking account of the dimensions of the input zone, several sensors will simultaneously be activated. For each of these activated sensors, a mean position of the finger on the input zone is thus determined in real time, by calculating the centre of gravity or barycentre of the activated sensors, preferably attributing more or less weight to them depending on the degree of coverage of the sensors by the finger, this weight being at a maximum when the finger covers a sensor over its entire surface, and at a minimum when only a small part of the sensor is covered.

After the character has been sampled, it may or may not be necessary to further process the signal and particularly to filter the noise that is typically observed during input of such data. In particular, it will be preferable to apply filtering and smoothing techniques to substantially remove the noise and smooth the trace of the character, of course without altering the essential features of the trace of the character. These various filtering and smoothing techniques, which are amply known to and within the grasp of those skilled in the art, will not be described here.

After sampling and, if appropriate, prior to processing of the signal, the number of strokes used by the user to trace the character has first of all to be detected. This number of strokes is easily determined by detecting the number of interruptions during tracing of the character, i.e. the appearance of a period of determined duration (typically several successive periods of inactivity) during which none of the sensors has been activated by the presence of the finger, the end of tracing of the character being detected in a similar manner but on the basis of a longer period of inactivity. A first selection of candidates can then be made on the basis of the number of strokes.

Then the general nature of each of the strokes has to be determined, i.e. particularly whether the stroke is of one-dimensional nature (a dot) or of two-dimensional nature (one or more successive segments). This is also easily determined by examining whether the set of samples for a given stroke is concentrated in a determined reduced zone, in which case one starts from the principle that it is the trace of a dot and one determines its position, designated $P_0$. If the set of samples extends over a broader zone, one then proceeds to what may be called a segmentation step which consists in examining each stroke in order to determine the number of segments composing the stroke, the rectilinear or curved nature of these segments and their geometry (angular orientation and position).

In order to carry out this segmentation, one preferably examines the evolution of the angular orientation of the trace of each stroke and one in particular detects the abrupt changes, or breaking points, of this angular orientation, these abrupt changes indicating the appearance of another segment. This consists in computing the derivative of the trace (the angular orientation of the segment being developed), or more exactly to calculate the slope of each elementary segment formed by two successive signal samples. A breaking point could easily be identified as being the appearance of a significant difference in angular orientation (greater than a determined limit, for example 90°) between two successive elementary segments.

By way of advantageous variant, segments of the same nature can be grouped together if their ends are close to each other in order to prevent any errors linked to the finger being inadvertently lifted up. One could also envisage removing certain segments of too reduced length at the beginning and end of the stroke in order not to take account of insignificant small movements when the finger is placed or lifted.

The rectilinear or curved nature of each segment is for example determined by linear approximation of each segment by a conventional least square method known to those skilled in the art. If the deviation between this linear approximation model is greater than a determined deviation, one starts from the principle that the segment in question is curved in nature and one for example determines the start and end orientations $\phi_1$, $\phi_2$ of this segment. The rotational direction w of the curved segment is also preferably determined in this case. Otherwise, one starts from the principle that this segment is rectilinear in nature and its angular orientation $\phi$ is determined. One preferably also proceeds to the determination of the positions of the end points of each segment, designated $P_1$ and $P_2$.

Based on the topological data and, if necessary, based on the geometrical data thus determined, one then moves on to the identification of the character among the set of possible candidates.

In this illustration of FIG. 5, two strokes A and B will thus be identified, including, for the first, a single segment, curved in nature, comprising a start angular orientation $\phi_1$ of around +90° and an end angular orientation $\phi_2$ of around −90°, with a strictly non-trigonometric rotational direction w, and, for the second, a single segment, rectilinear in nature, comprising an angular orientation $\phi$ slightly greater than 0° taking account of the inclination of this segment in the illustration of FIG. 5. Given that there is typically no other similar character in terms of topology and angular orientation, it will be noted that the segment end position data are not useful in the case of the trace of the character "A".

Upon examining the set of characters defined by way of illustration in FIGS. 4a to 4d, it can be seen that the characters having the same topology as that of the trace of the character "A" illustrated in FIG. 5, namely a first stroke comprising a single curved segment and a second stroke comprising a single rectilinear stroke, are limited to the characters "A", "E", "F", "J", "K", "Q", "Y", "Z", "O", "4", "7", this similarity in terms of topology being indicated by a frame around the models concerned in FIGS. 4a to 4d. Taking account of the rotational direction of the curved segment (non-trigonometric here), candidates "E", "K", "Q", "Y", "Z", "O" and "4" can be rejected (in the specific case of a set of characters for right-handed persons). Comparison of the angular orientation of the segments will allow all of the candidates to be eliminated unequivocally with the exception of character model "A".

Figure 6A:
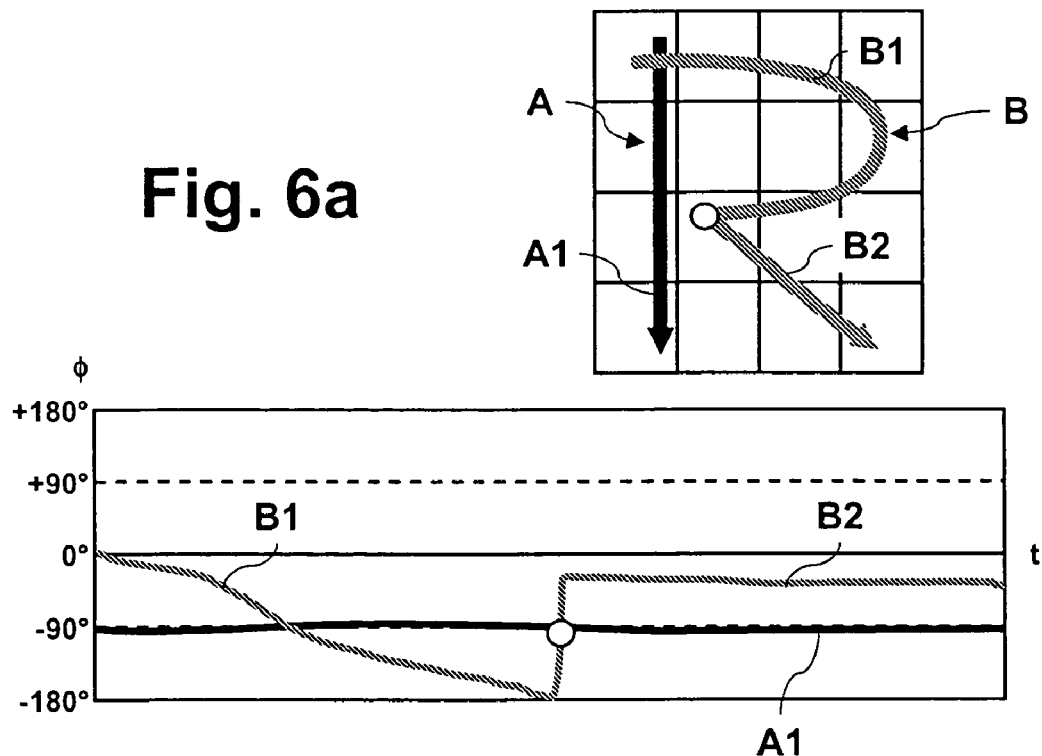
FIGS. 6a to 6c show three examples of the trace of the character "R" and a diagram illustrating the evolution of the trace of this character, in terms of angular orientation, for each stroke used to make this trace.
Figure 6B:
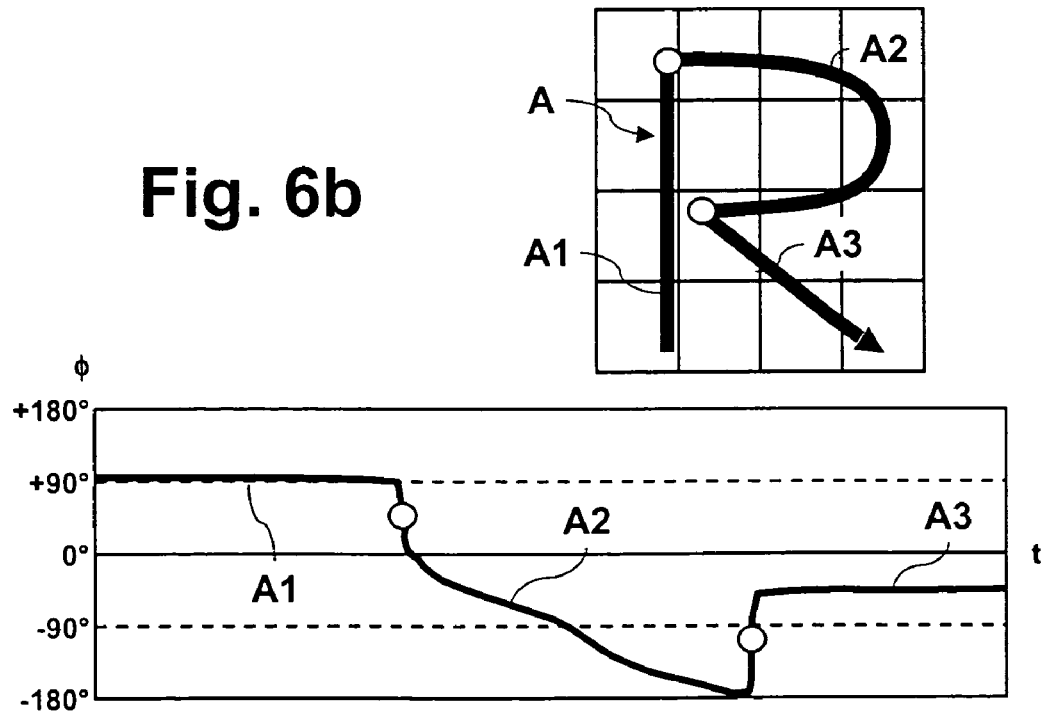
Figure 6C:
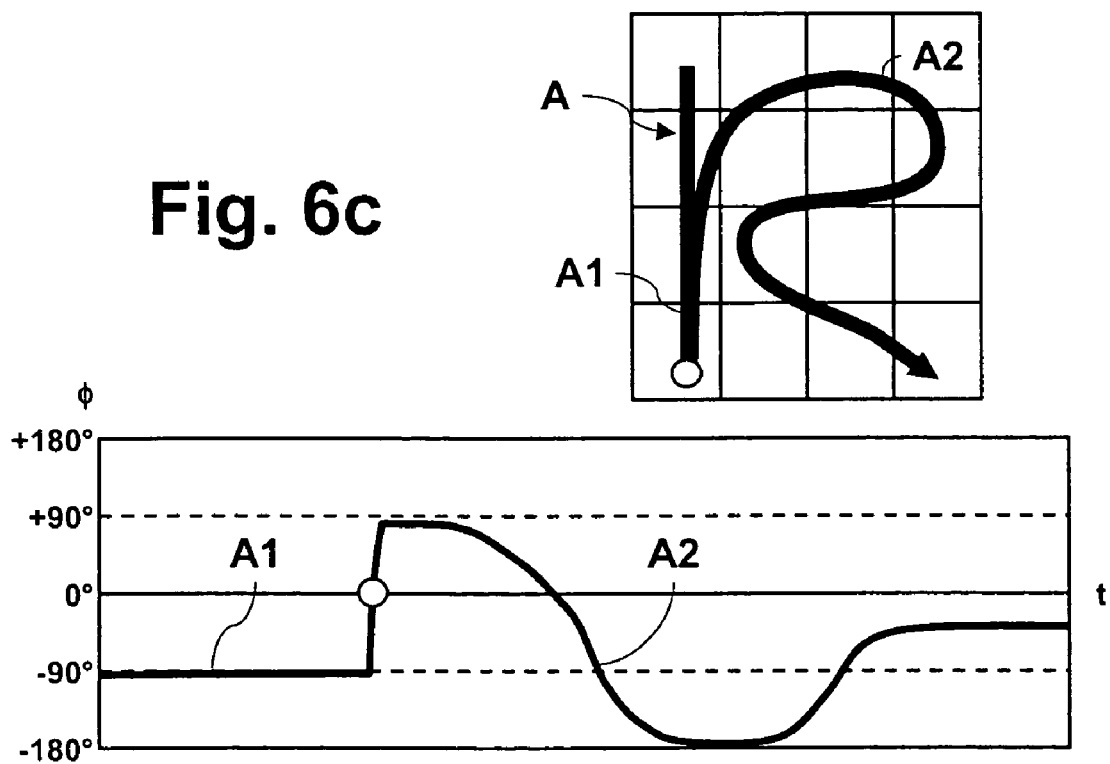

FIGS. 6a to 6c show, by way of comparison, three example traces of the character "R", FIG. 6a illustrating a trace in two strokes and FIGS. 6b and 6c illustrating a trace in a single stroke. Each of these Figures shows a schematic illustration of the character traced on the input zone and a diagram showing the evolution of the angular orientation of the tangents to the trace of each stroke over a standardised period of time. The breaking points coinciding with an abrupt change of angular orientation are schematically represented by a dot in the Figures. It should again be stressed that FIGS. 6a to 6c are not exhaustive of the possibilities that can be adopted to trace the character "R".

FIG. 6a shows a character "R" traced in two strokes respectively designated A and B. The first stroke A is formed of a substantially vertical rectilinear segment A1 traced from top to bottom and consequently having an angular orientation φ of around −90°. The second stroke B is formed of two successive segments, respectively a curved segment B1 followed by a rectilinear segment B2 both traced from top to bottom. Curved segment B1 has start $\phi_1$ and end $\phi_2$ angular orientations respectively equal to 0° and around −180°, the rotational direction being non-trigonometric. Rectilinear segment B2 has an angular orientation φ of around −45°. The two segments B1 and B2 can easily be differentiated because an abrupt variation in the angular orientation (from −180° to −45°) can be seen at the end of the trace of the curved part of the "R" before the trace of the last rectilinear portion.

With reference to the diagram of the evolution of the angular orientation in FIG. 6a, it can be seen that stroke A and its single segment A1 are translated by a substantially horizontal line located at approximately −90°. Stroke B is translated by a first portion, similar, at a first approximation, to a negative slope line portion of between 0° and around −180° and corresponding to curved segment B1, followed by a substantially horizontal line portion located at around −45° and corresponding to rectilinear segment B2. The abrupt change of angular orientation between segments B1 and B2 appears clearly from this diagram.

FIG. 6b illustrates a trace of the character "R" performed in a single stroke A, namely a rectilinear stroke A1 at around +90°, followed by a curved segment A2 varying from 0° to around −180° and finally a rectilinear segment A3 at around −45°. In the diagram of the evolution of the angular orientation of stroke A, one thus sees a first substantially horizontal line portion at around +90°, followed, at a first approximation, by a second negative sloping line portion between 0° and around −180°, and finally, a third substantially horizontal line portion at around 45°.

FIG. 6c illustrates another possibility of tracing the character "R" in a single stroke A, this stroke A comprising a first rectilinear segment A1 at around −90°, followed by a curved segment A2 varying from +90° to around 45° with a mixed rotational direction, i.e. a curve whose angular orientation decreases first of all from +90° to around −180°, then increases from −180° to −45° approximately. It will again be noted that curved segment A2 with a mixed rotational direction can alternatively be broken down into two successive curved segments of non-trigonometric then trigonometric direction.

Figure 7A:
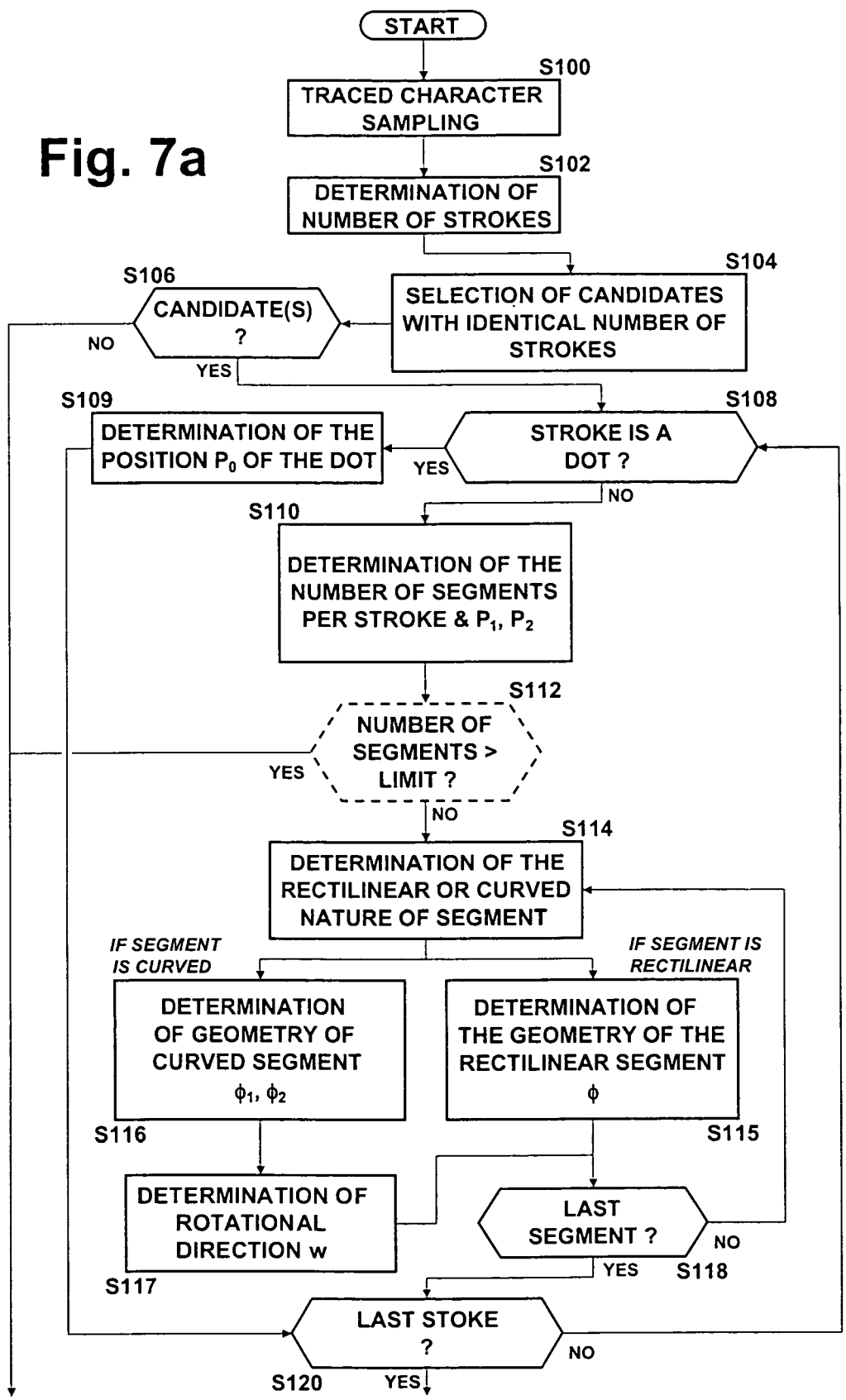
FIGS. 7a and 7b show a flow chart of an example implementation of the character recognition method according to the invention.

By means of FIGS. 7a and 7b, an example implementation of the character recognition method according to the present invention will now be described. FIG. 7a shows a first part of a flow chart illustrating this implementation of the method according to the invention, the second part of this flow chart being shown in FIG. 7b.

As already mentioned, the method begins at step S100 by sampling the traced character, this sampling may include preprocessing of the signal if necessary.

At step S102, the number of strokes performed to trace the character is determined, this number allowing selection of a first group of candidates comprising an identical number of strokes as shown schematically at step S104.

Figure 7B:
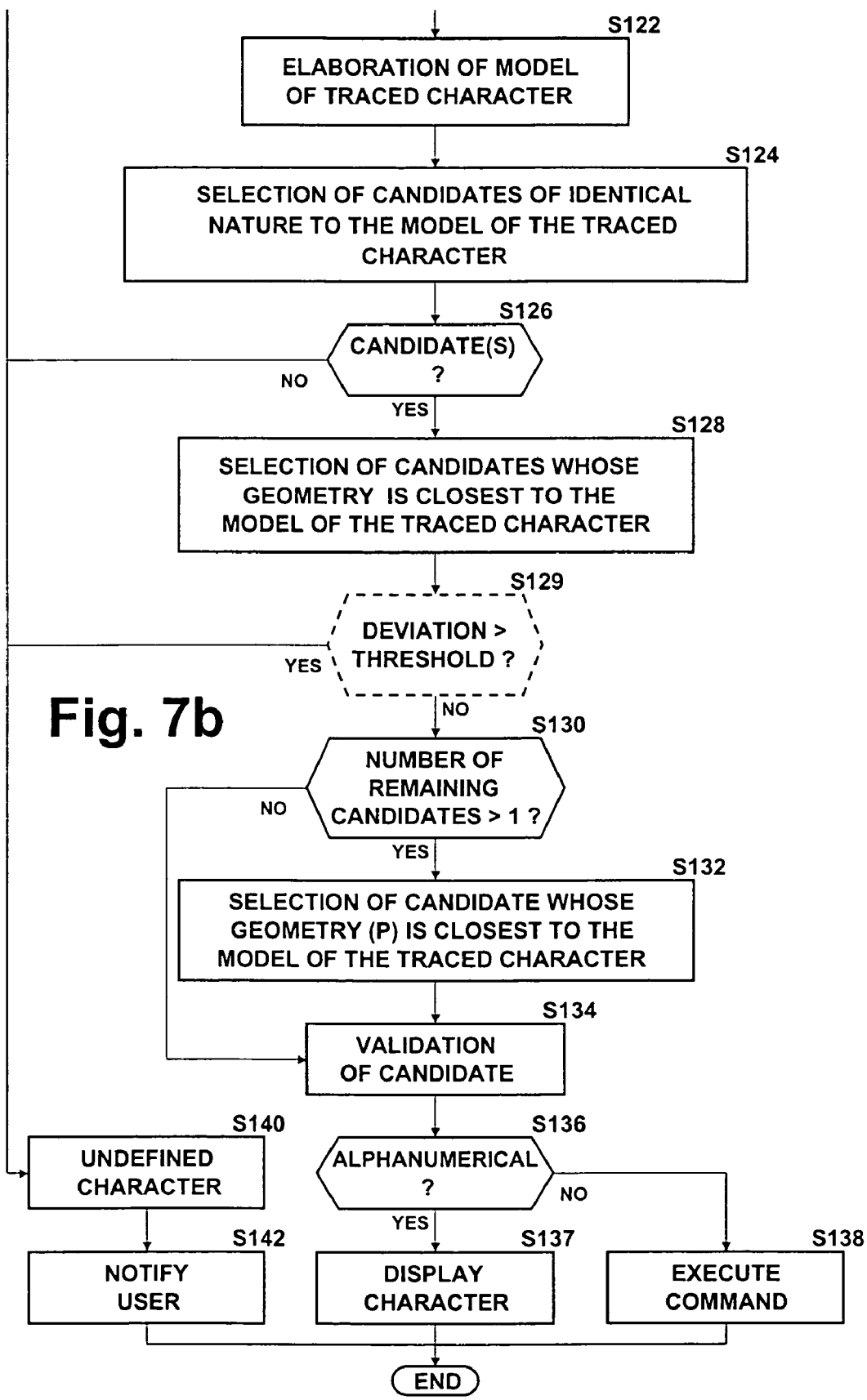

If candidates are selected (step S106), the nature then the composition of each stroke starts to be determined as shown schematically by steps S108 to S120, otherwise one starts from the principle that the character is not defined and the user is notified of this fact as illustrated by steps S140 and S142 of the flow chart in FIG. 7b.

At step S108, the one-dimensional or two-dimensional nature of each stroke is first of all determined, namely, whether it is a dot or a number of successive segments. If the stroke is a dot, the position of the dot is determined at step S109, otherwise the stroke in question starts to be segmented, as illustrated by steps S110 to S118, which are repeated as many times as there are segments in the stroke in question.

At step S110, the number of segments forming the stroke is thus determined, for example by determining abrupt angular orientation changes in the stroke as already mentioned, determination of positions $P_1$, $P_2$ of the segment ends being carried out at this step. As illustrated by step S112, the recognition process can advantageously be interrupted by steps S140 and S142 if the number of segments is higher than a determined limit, which shows that the trace does not correspond to any defined characters. If this is not the case, at step S114 the rectilinear or curved nature of each segment is determined, for example by linear approximation of each segment and selection as a function of the deviation between this linear approximation and the trace of the segment in question. As a function of the rectilinear or curved nature of the segment, the angular orientation φ of the rectilinear segment is determined at step S115 or the start and end angular orientations $\phi_1$ and $\phi_2$ of the curved segment are determined at step S116. If the segment is curved in nature, the topological data is completed by determining the rotational direction w of the curved segment as schematically shown by step S117. This process is repeated for each segment and for each stroke as illustrated by steps S118 and S120.

At the end of these steps, one has the data necessary to elaborate, at step S122, a model of the traced character which can be used to select the potential candidates and eventually identify the traced character. At step S124, a selection is thus made of a second group of candidates from among the candidates of the first group determined at step S104, whose strokes are of the same nature and composition as those of the model of the traced character. It is not necessary, at this stage, to consider the data of geometrical nature of the models, namely the parameters of evolution of the angular orientation or of position of the segments.

At the end of this selection, one can then identify, at step S126, whether the traced character corresponds to a defined model or whether this model is unknown, in which case the second group does not include any candidates.

If the second group includes one or more candidates, at step S128 a selection is made of a third group of candidates from among the candidates of the second group whose geometry in terms of angular orientation is closest to that of the model of the traced character. In order to do this, the deviation in terms of angular orientation between the segments forming each stroke is for example determined, and the best candidate(s) having the smallest deviation are selected. In practice, a certain tolerance is allowed on these angular orientations (for example ±10°).

At step S129, the candidate(s) can advantageously be rejected if the deviation in terms of angular orientation is too great, meaning that the traced character is not defined. The process then ends by steps S140 and S142. If the candidate(s) are deemed sufficiently close to the traced character, one firstly determines, at step S130, whether more than one candidate have been selected at this stage, in which case, at step S132, the candidate whose geometry in terms of position of the segments (absolute or relative) is closest to that of the model of the traced character is selected from the third group, this candidate being then validated at step S134. If the third group only includes one candidate at step S130, this candidate is validated directly at step S134 as illustrated.

At the end of validation step S134, the traced character has thus been recognised and validated and one can thus display this character if it is an alphanumerical (or symbolic) character or execute the associated command if it is a control character as illustrated by steps S136, S137 and S138.

It will be understood that the flow chart illustrated in FIGS. 7a and 7b only constitutes a particular implementation of the invention and that various modifications, such as the redistribution of certain tests upstream or downstream in the flow chart, and/or improvements can be made. Thus, steps S112 and S129 in FIGS. 7a and 7b, which consist in interrupting the recognition process respectively if the number of segments forming a stroke is higher than a determined limit or if the deviation in terms of angular orientation between the candidate(s) and the model of the traced character is greater than a limit value, can be omitted. These steps, however, advantageously allow a wasteful search or erroneous interpretation of a character to be prevented. It will thus be noted that the character recognition method advantageously allows erroneous character recognition to be prevented and consequently limits erroneous data input into the device implementing the method. The method according to the invention is further very independent of the exact shape of the manual trace of the character, recognition being essentially based on the tendencies of the trace when it is performed.

Figure 8A:
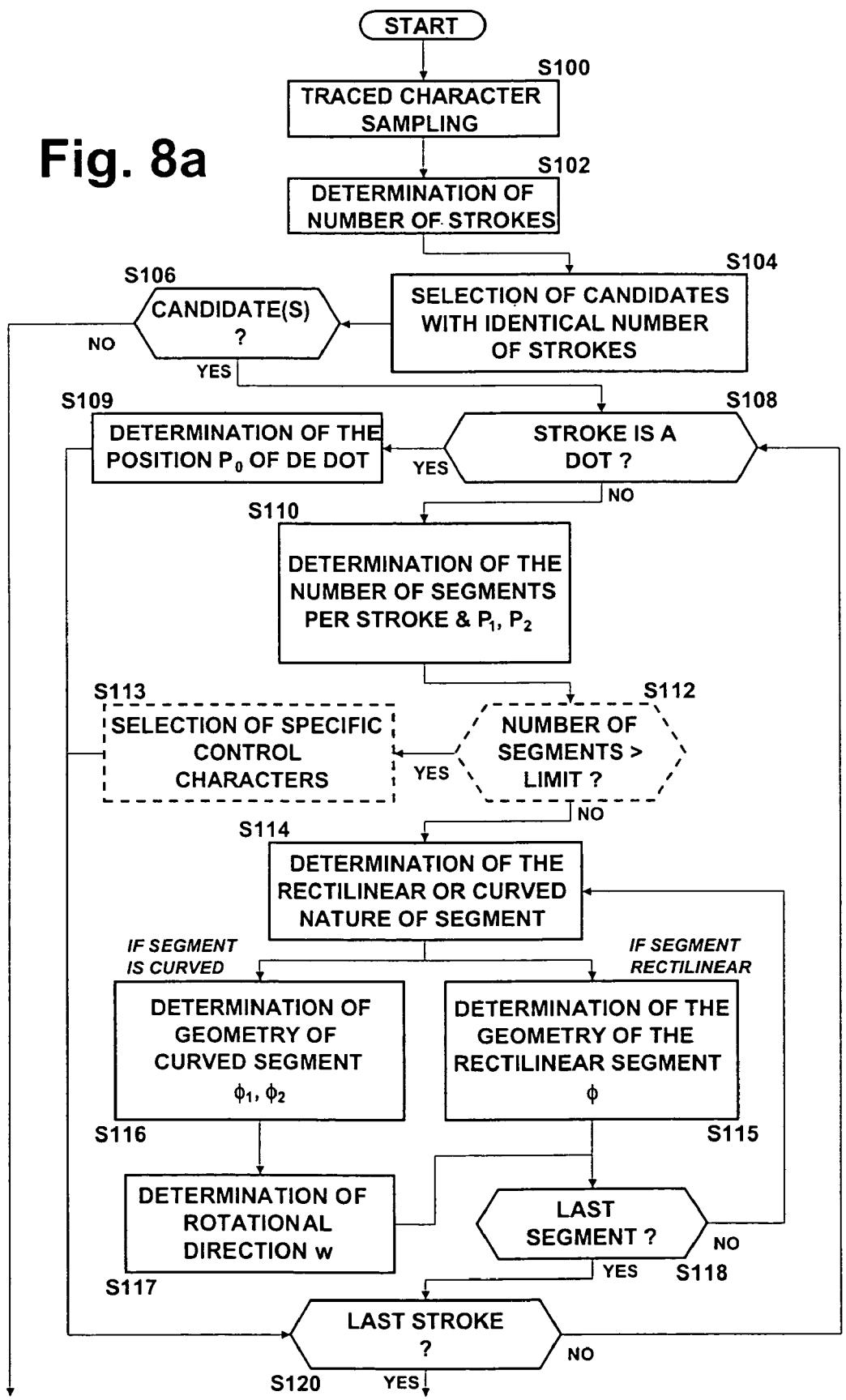
FIGS. 8a and 8b shows a flow chart of an alternative implementation of the method illustrated in FIGS. 7a and 7b.
Figure 8B:
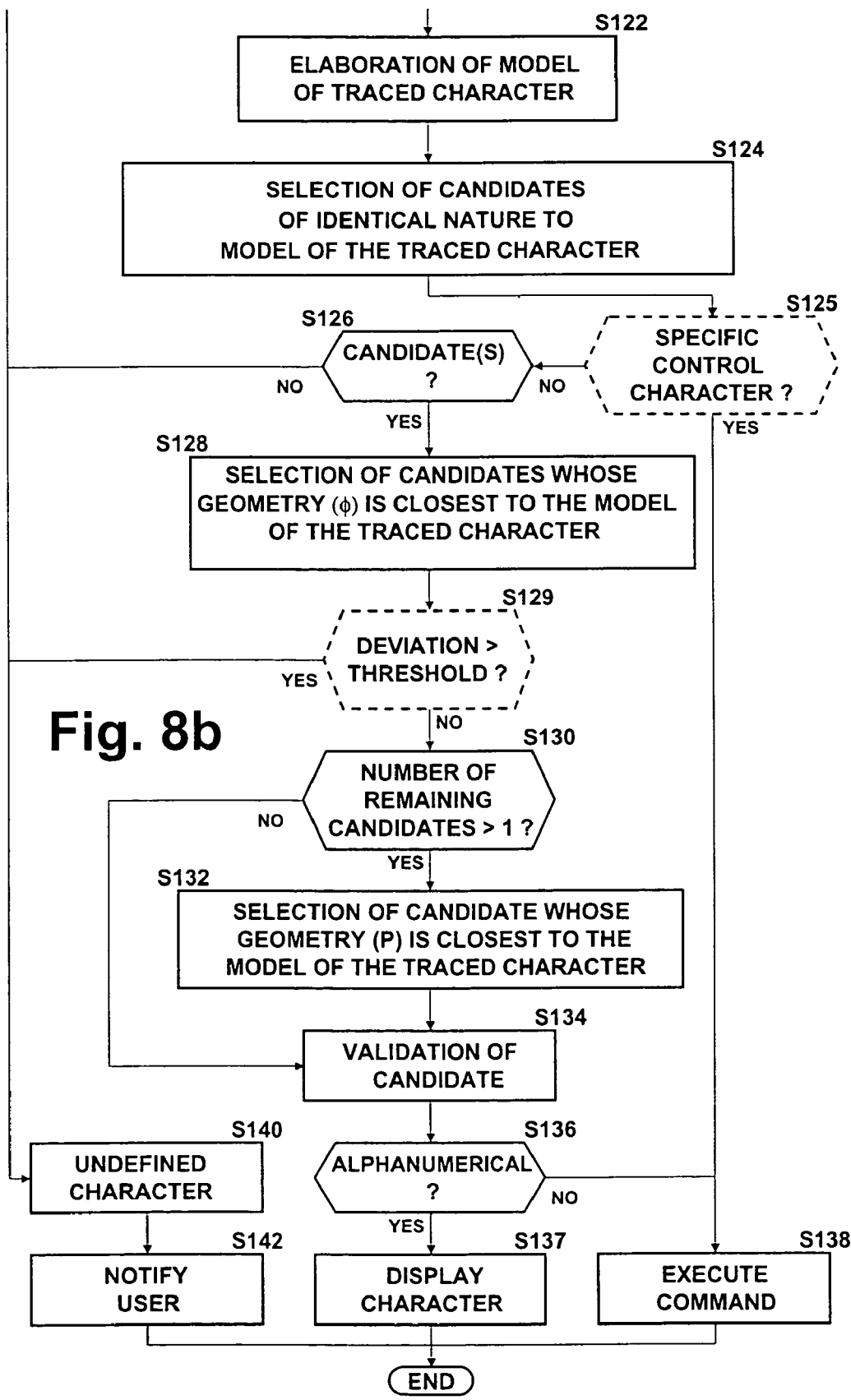

As illustrated in FIGS. 8a and 8b, the implementation illustrated in FIGS. 7a and 7b can advantageously be modified so as to includes additional steps for identifying specific control characters associated with particular commands. These specific control characters are advantageously described in an unequivocal manner by data or parameters of topological nature.

By way of example, a trace of a stroke including more than a certain number of successive segments (for example at least five) can be considered to be the trace of a specific control character associated with a specific command as illustrated in FIG. 4d (for example deletion of a previously inputted character or complete re-initialisation of inputted data). Given that no other character can be traced in this way (provided however that a character has not been defined in such a manner), it is not necessary to proceed to determination of the rectilinear or curved nature of the segments, nor to determination of the geometrical parameters of the segments.

With reference thus to FIGS. 8a and 8b, an additional step S113 can therefore be provided, after step S112 which consists in determining the number of segments per stroke, this additional step S113 consisting in restricting the first group of determined candidates at step S104 to a set of specific control characters, in which case neither the rectilinear or curved nature of the segments, nor the geometry of said segments are determined at steps S114 to S116. Another additional step S125 is then provided after the selection step S124 of the second group of candidates, in order to identify whether the candidate corresponds to a specific control character, in which case the command associated with this specific control character is directly executed at step S138.

By way of advantageous variant, an additional step can also be provided after step S118 in FIG. 7a (or 8a) for the purpose of filtering the segments whose length is not sufficiently significant, such segments being able to be considered as hesitations on the part of the user.

Also by way of advantageous variant, the set of selected candidates can also be restricted, by examining the approximate relative position of the first and last points of the trace or of each stroke of the character. Thus, rough criteria defining whether a stroke respectively begins or ends, in a high or low part, and/or in a left or right part of the trace of the character allows certain characters to be automatically rejected. It is for example unrealistic to envisage an "L" whose trace begins in the lower part of the character.

Also by way of advantageous variant, one can examine whether a stroke of the trace of the character is open or closed and consequently restrict the number of candidates on the basis of this criterion. The models of the characters will of course have to have been defined in this way, i.e. an indication as to whether a stroke is open or closed must be included.

With reference again to FIGS. 7a and 7b and additionally to FIGS. 9a, 9b and 10a, 10b, various examples illustrating how the character recognition method according to the invention operates when a character trace is performed, will now be described.

Figure 9A:
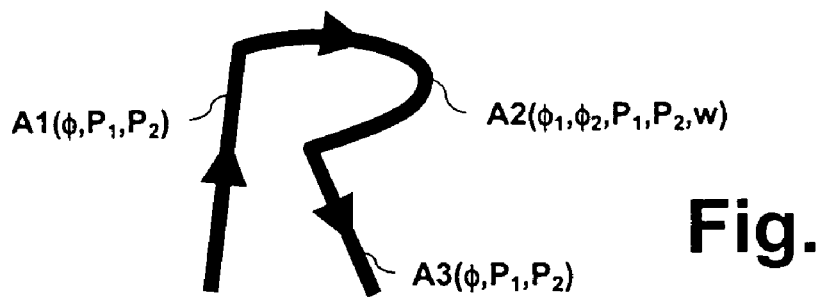
FIGS. 9a and 9b show, by way of illustration, respectively a possible trace of the character "R" and candidates having a similar topography.

FIG. 9a shows an example of the character "R" traced on the input zone. In this example, the character is traced in a single stroke A in the form of a first rectilinear segment A1 followed by a curved segment A2 and a second rectilinear segment A3. By applying the implementation described with reference to FIGS. 7a and 7b, a first group of candidates capable of being traced in one stroke will thus be selected at step S104. The rectilinear or curved nature of the three segments A1 to A3 of this single stroke and their geometrical data of angular orientation will then be determined at steps S110 to S120 in accordance with the description hereinbefore.

Solely by way of example, it will be assumed that the first rectilinear segment A1 has an angular orientation $\phi$ of around +80°, that curved segment A2 has a start angular orientation $\phi_1$ of around +10° and an end angular orientation $\phi_2$ of around −170°, and that second rectilinear segment A3 has an angular orientation $\phi$ of around −60°. Curved segment A2 is also traced with a non-trigonometric rotational direction. A model of the traced character formed of these features is then elaborated at step S122. The angular orientations of the traced character segments can be summarized as follows:

| | STROKE A | | |
|---|---|---|---|
| TRACED CHARACTER | A1 ($\phi$) | A2 ($\phi_1$, $\phi_2$) | A3 ($\phi$) |
| R | +80° | +10°   −170° | −60° |

Figure 9B:
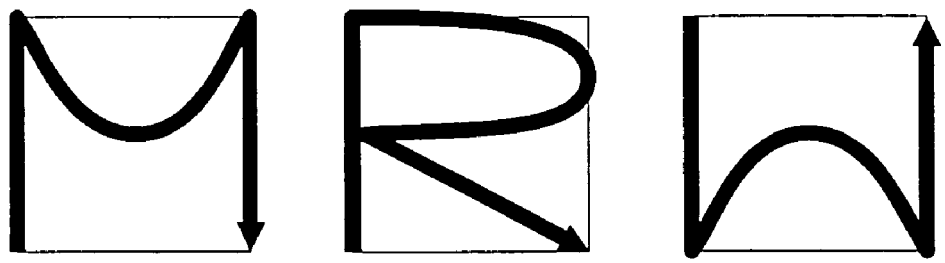

During step S124 a selection is made of all the candidates whose nature and composition are identical to the model of the traced character, i.e. all the models defined as being performed in a stroke formed of three successive segments including a first rectilinear segment, a second segment that is curved in nature and a third segment that is rectilinear in nature, in that order. By way of illustrative example, the models of character "M", character "R" and character "W" defined in the set of characters of FIGS. 4a and 4b are shown in FIG. 9b (these models have of course been defined like this beforehand). These candidates have the same topology (without considering the rotational direction of the curved segment) as the traced character in FIG. 9a, i.e. a first segment of rectilinear nature, followed by a second segment of curved nature, then a third segment of rectilinear nature. Other models could exist if appropriate, but these have not been shown for the sake of simplification.

The angular orientations of the segments of the models of characters "M", "R" and W" may, amongst other examples, have been defined as follows:

| CANDIDATES | STROKE A | | | |
|---|---|---|---|---|
| | A1 (φ) | A2 (φ₁, φ₂) | | A3 (φ) |
| "M" | +90° | −90° | +90° | −90° |
| "R" | +90° | 0° | −180° | −45° |
| "W" | −90° | +90° | −90° | +90° |

By adding the additional topological criterion concerning the rotational direction w of the curved segments, candidate "M" is rejected, the latter having a curved segment of trigonometric rotational direction, unlike candidates "R" and "W".

At the end of selection step S124, if one considers the rotational direction of curved segment A2, there are at least two candidates capable of corresponding to the traced character, namely candidates "R" and "W". The vast majority of candidates have, however, been eliminated on the basis only of topological considerations.

The recognition process then continues at step S128 with the selection of the candidate or candidates whose geometry in terms of angular orientation is the closest to that of the model of the traced character. Thus, by determining for example the angular orientation deviation of each segment with respect to each candidate, the candidate most faithful in terms of angular orientation is determined.

It will easily be noted, by comparing the angular orientations of characters "R" and "W", that the character traced in FIG. 9a is more faithfully represented by the "R" model. Although the angular orientations of the traced character segments are not strictly identical to the "R" character model, they are nonetheless substantially and sufficiently different from the angular orientations of the "W" character model segments. This significant difference easily allows candidate "W" to be eliminated and only the R" character model to be kept. Finally, the "R" character model is then validated. It will also be noted that candidate "M" could be eliminated in a similar manner, even if the rotational direction w of curved segment A2 had not been examined.

Figure 10A:
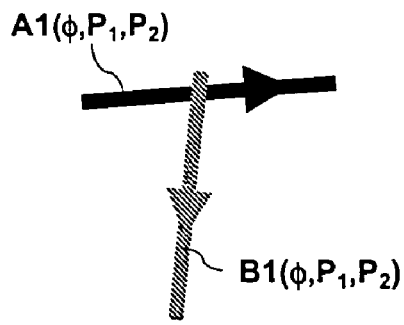
FIGS. 10a and 10b shows, by way of illustration, respectively a possible trace of the character "T" and candidates having a similar topography.

FIG. 10a shows an example of the character "T" traced on the input zone. In this example, the character is traced in a first stroke comprising a first rectilinear segment A1 followed by a second stroke B comprising a second rectilinear segment B1. Again applying the implementation described with reference to FIGS. 7a and 7b, a first group of candidates capable of being traced in two successive strokes will thus be selected at step S104. The rectilinear nature of the two segments A1 to B1 and their geometric angular orientation (and position) data will then be determined at steps S110 to S120 in accordance with the description hereinbefore. The strokes can obviously be reversed.

Solely by way of example, it will be assumed that the first rectilinear segment A1 has an angular orientation φ of around +5°, and that rectilinear segment B1 has an angular orientation φ of around −95°. A model of the traced character formed of these features is then elaborated at step S122. The angular orientations of the traced character segments can be summarised as follows:

| | STROKE A | STROKE B |
|---|---|---|
| | A1 (φ) | B1 (φ) |
| TRACED CHARACTER | | |
| T | +5° | −95° |

Figure 10B:
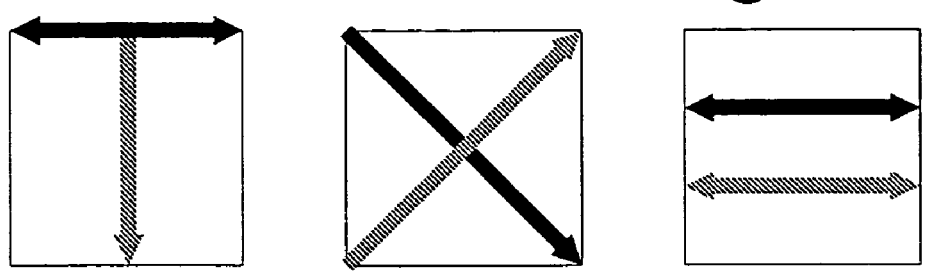
Figure 10B:
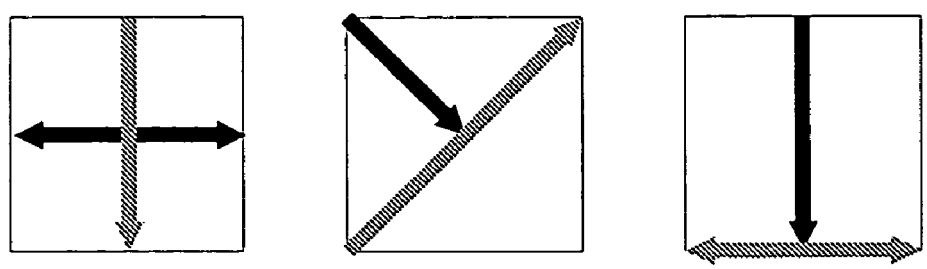
Figure 11:
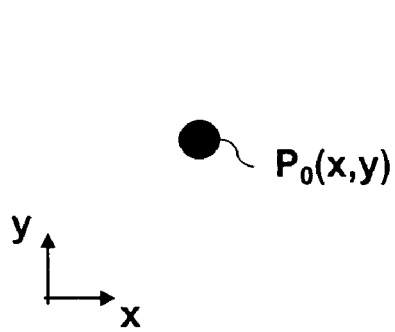
FIG. 11 is an illustration representing the definition of a stroke of one-dimensional nature, i.e. a dot.
Figure 12:
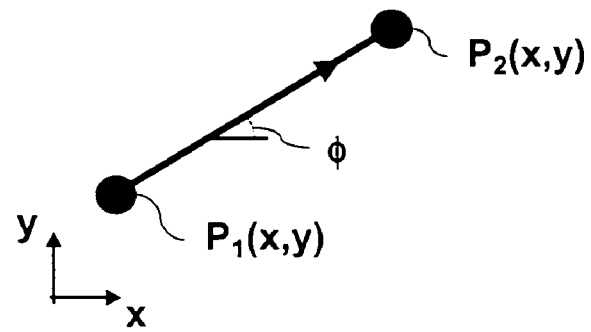
FIG. 12 is an illustration representing the definition of a segment of rectilinear nature.
Figure 13A:
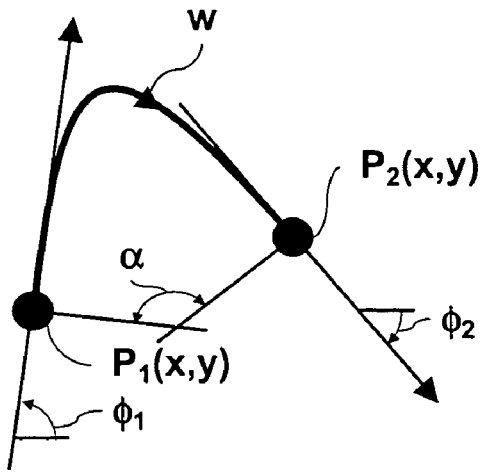
FIGS. 13a to 13c are illustrations representing the definitions of a segment of curved nature having respectively a non-trigonometric, trigonometric and mixed rotational direction.
Figure 13B:
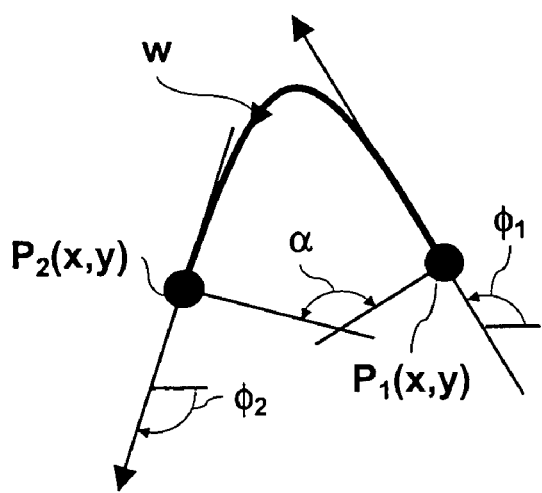
Figure 13C:
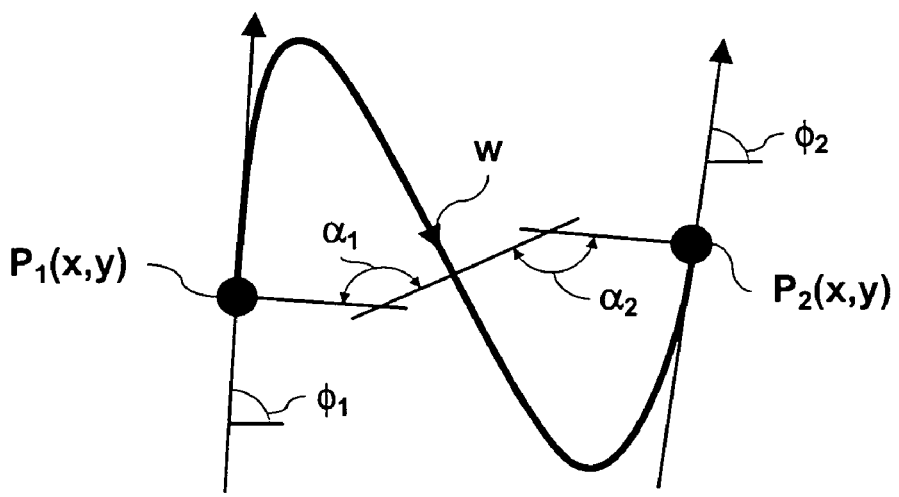

During step S124 the selection is made of all the candidates whose nature and composition is the same as that of the model of the traced character. i.e. all the models defined as being performed with two strokes each formed of a single segment of rectilinear nature. By way of illustrative example, FIG. 10b shows five candidates corresponding to this definition (these models were of course previously defined in such a manner). FIG. 10b thus shows the models of the characters "T", "X", "Y", "+" and "=" as well as the control character "CAPS ON/OFF" (switching between upper/lower case letters) having the same topology, namely a first stroke comprising a single segment of rectilinear nature, followed by a second stroke also comprising a single segment of rectilinear nature. Other models could exist, if appropriate, but these have not been shown for the sake of simplification.

The angular orientations of the segments of character models "T", "X", "Y", "+", "=" and "CAPS ON/OFF" may, amongst other examples, have been defined as follows (the horizontal segments may generally be traced from left to right or from right to left):

| CANDIDATES | STROKE A A1 (φ) | STROKE B B1 (φ) |
|---|---|---|
| "T", "+" | 0°/±180° | −90° |
| "X", "Y " | −45° | −135° |
| "=" | 0°/±180° | +0°/±180° |
| "CAPS ON/OFF" | −90° | 0°/±180° |

At the end of selection step S124, there are at least five candidates capable of corresponding to the traced character. The vast majority of candidates have, however, been eliminated on the basis of purely topological considerations.

In this case, it can easily be seen, by comparing the angular orientations of each segment of the models illustrated in FIG. 10b with the angular orientations of the traced character model of FIG. 10a, that the latter is most faithfully represented by the character model "T" or the character model "+" and that character models "X", "Y", "=" and "CAPS ON/OFF" can easily be eliminated. It can also be seen however, that the geometric angular orientation parameters alone do not, at step S128, allow distinction as to which of candidates "T" or "+" is the most appropriate.

As already described, the process continues at step S132 of FIG. 7b during which a selection is made of the candidate whose geometry, in terms of position, is closest to that of the traced character model. In order to do this, one can simply use and compare the position of the strokes (or the segment ends) of the candidates with the position of the strokes (respectively the segment ends) of the model of the traced character. In the case of a model comprising a stroke of one-dimensional nature, i.e. a dot, the position of the dot in question will be directly compared.

One possible solution, applicable to all the characters, can consist in determining the position of each dot or each end of the segments forming the character in a normalised Cartesian referential, i.e. a referential of the Cartesian type whose x and y coordinate vectors are normalised with respect to the width (along the x coordinate axis) and the height (along the y coordinate axis) of the traced character. The position of the segment ends and/or dots forming the character can then be determined in the normalised Cartesian referential thus defined.

In the particular case illustrated in FIGS. 10a and 10b, candidate "T" can thus easily be recognised as the character most faithful to the traced character by determining the position gap of the various segment ends, the character "T" being characterised by the fact that the ends of the first segment A1 are located substantially in the upper part of the character.

The case that has just been presented and which arises when the character "T" is traced (or alternatively when the character "+" is traced) is similar for other characters. This approach will for example be adopted to differentiate the traces of the characters "X" and "Y", or the traces of the characters "D" and "P".

Preferably, the models will thus be grouped together in a plurality of families as a function of their topological parameters and, if appropriate, as a function of their geometric parameters of evolution of angular orientation, each family comprising one or more models that can only be distinguished from other models of the family by their geometric parameters of position, this being the case of characters "T" and "+", "X" and "Y", "D" and "P", etc.

In this case, the method consists in (i) identifying the family of models that best corresponds to the model of the manual trace of the character and (ii) identifying the model in the family which has the geometric parameters of position closest to the model of the manual trace of the character as this has been described hereinbefore.

It will be understood that various modifications and/or improvements obvious to those skilled in the art can be made to the character recognition method and device described in the present description without departing from the scope of the invention defined by the annexed claims. In particular, it will be understood that the set of characters illustrated in FIGS. 4a to 4d is in no way exhaustive or limiting of the possible applications of the present invention. It will also be understood that definition of rotational direction w of the curved segments may or may not be used. The invention is also not limited to application in a timepiece as illustrated in FIG. 1, nor to the use of capacitive sensors to form the input zone.

The invention claimed is:

1. A method for recognising characters traced manually on an input zone of an electronic device by means of a finger or a tracing instrument, said input zone comprising a plurality of sensors each capable of being activated by means of said finger or said tracing instrument, said method comprising the step of comparing the manual trace of a character performed on said input zone with a group of characters from a predetermined set of characters, wherein each character of said set of characters is represented by at least one reference model representative of a way in which the character in question can be traced, and wherein a trace model representative of the way in which said manual trace of the character has been performed on said input zone is elaborated, the reference models comprising at least the following topological parameters concerning the topology of the character, namely:

(i) the number of strokes used to trace the character;
(ii) the nature of each stroke, namely whether it is formed of a dot or one or more segments; and
(iii) the composition of each stroke formed of one or more segments, namely:
the number of segments forming said stroke; and
the nature of each segment, namely whether it is a segment of rectilinear or curved nature, the models further comprising, if previous steps (i) to (iii) are not sufficient to recognize the manually traced character:

(iv) for each segment of rectilinear or curved nature, geometric parameters representative of the evolution of angular orientation of the trace of the segment; and/or
(v) for each stroke, geometric parameters representative of the position of the stroke, said method further comprising the steps of:

determining a group of candidates, from among the reference models of the characters of said set of reference characters, which have topological parameters similar to the trace model of said manual trace of the character; then if the group of candidates includes more than one candidate, identifying the candidate that has the geometric parameters of evolution of angular orientation and/or of position closest to the trace model of said manual trace of the character.

2. The method according to claim 1, wherein the reference models are regrouped in a plurality of families as a function of their topological parameters, each family including one or more reference models that can be distinguished from other reference models of the family only as a function of their geometric parameters of position, the method comprising the steps of:

identifying the family of reference models that best corresponds to the trace model of the manual trace of the character; and identifying the reference model in said family that has the geometric parameters of position closest to the trace model of the manual trace of the character.

3. The method according to claim 1, wherein said geometric parameters representative of the evolution of angular orientation of the trace of the segment include at least:

for a segment of rectilinear nature, the angular orientation of said segment; and for a segment of curved nature, the start or end angular orientation at one end of said segment of curved nature, and wherein said topological parameters also include, for a segment of curved nature, the rotational direction of said segment, said rotational direction being at least trigonometric or non-trigonometric.

4. The method according to claim 3, wherein said geometric parameters representative of the evolution of angular orientation of the trace of the segment further include:

for a segment of curved nature, the total angle of development of said segment of curved nature.

5. The method according to claim 1, wherein said topological parameters also include, for each stroke formed of one or more segments, an indication as to whether said stroke is closed or open.

6. The method according to claim 1, wherein said geometric parameters representative of the position of the stroke include the position, on said input zone or with respect to the trace of the character, of at least one point representative of said stroke, namely the position of a stroke of a dot and at least the position of one end of a stroke formed of one or more segments.

7. The method according to claim 1, wherein said parameters concerning the topology of the character further include an indication concerning the approximate position, on said input zone or with respect to the trace of the character, of a stroke formed of a dot or of at least one end of a stroke formed of one or more segments, namely whether said stroke or said end is located substantially in a high or low, and/or left or right part of said input zone or of the trace of the character.

8. The method according to claim 1, comprising the steps of:
(a) sampling the manual trace of the character performed on said input zone;
(b) determining the number of strokes used to perform said manual trace of the character;
(c) selecting a first group of candidates including an identical number of strokes;
(d) if said first group does not include any candidates, interrupting recognition, otherwise, determining the nature, composition and geometry of each stroke, namely:
if it is a stroke formed of a dot, determining the position of said stroke; or
if it is a stroke formed of one or more segments, segmenting the stroke in order to determine the number of segments forming the stroke, determining the rectilinear or curved nature of each segment, and determining the geometry of each segment, namely the position of the ends of each segment and:
for each segment of rectilinear nature, the angular orientation of each segment; or
for each segment of curved nature, the start and end angular orientations at the ends of said segment as well as the rotational direction of said segment, said rotational direction being at least trigonometric or non-trigonometric;
(e) elaborating the model representative of said manual trace of the character;
(f) selecting a second group of candidates, from among the candidates of said first group, whose nature, and if appropriate, whose composition of each stroke are identical to those of the model of said manual trace of the character;
(g) if said second group does not include any candidates, interrupting recognition, otherwise, selecting a third group of candidates, from among the candidates of said second group, whose geometry in terms of angular orientation of the segments is closest to that of the model of said manual trace of the character; and
(h) if said third group only includes one candidate, validating said candidate, otherwise, selecting the candidate, from among the candidates of the third group, whose geometry in terms of position is closest to that of the model of said manual trace of the character, then validating the candidate.

9. The method according to claim 8, wherein said set of characters includes a group of specific control characters, each of which is associated with a determined command, said specific control characters each being represented by an unequivocal model comprising at least one stroke formed of a number of segments higher than a determined limit,
and in that, if the number of segments in a stroke determined at step d) is higher than said determined limit, said first group of candidates is restricted to said group of specific control characters, in which case neither the rectilinear or curved nature, nor the geometry of said segments are determined,
the specific control character, whose stroke has an identical nature and composition to those of the trace model of the manual trace of the character being then selected at step f) and the associated command being executed.

10. The method according to claim 1, wherein the reference models are regrouped in a plurality of families as a function of their topological parameters and as a function of their geometric parameters of evolution of angular orientation, each family including one or more reference models that can only be distinguished from other reference models of the family as a function of their geometric parameters of position,
the method comprising the steps of:
identifying the family of reference models that best corresponds to the trace model of the manual trace of the character, and
identifying the reference model in said family that has the geometric parameters of position closest to the trace model of the manual trace character.

11. An electronic character recognition device comprising:
an input zone comprising a plurality of sensors each capable of being activated by means of a finger or tracing instrument,
detection means for producing, for each sensor of said input zone, at a determined moment, a signal representative of the activation of said sensor by said finger or said tracing instrument;
processing means in particular for comparing the manual trace of a character performed on said input zone with a group of characters from a predetermined set of characters,
wherein each character of said set of characters is represented by at least one reference model representative of a way in which the character in question can be traced, and wherein said processing means are arranged for elaborating a trace model representative of the way in which said manual trace of the character has been performed on said input zone,
the reference models comprising at least the following topological parameters concerning the topology of the character, namely:
(i) the number of strokes used to trace the character;
(ii) the nature of each stroke, namely whether it is a stroke formed of a dot or of one or more segments; and
(iii) the composition of each stroke formed of one or more segments, namely:
the number of segments forming said stroke; and
the nature of each segment, namely whether it is a segment of rectilinear or curved nature,
the reference models further comprising, if the previous topological parameters (i) to (iii) are not sufficient to recognize the manually traced character:
(iv) for each segment of rectilinear or curved nature, geometric parameters representative of the evolution of angular orientation of the trace of the segment; and/or
(v) for each stroke, geometric parameters representative of the relative or absolute position of the stroke,
said processing means comprising:
means for determining a group of candidates, from among the reference character models of said set of characters, which have topological parameters similar to the trace model of said manual trace of the character; and
if the group of candidates includes more than one candidate, means for identifying the candidate that has the geometric parameters of evolution of angular orientation and/or of position closest to the model of said manual trace of the character.

12. The device according to claim 11, further including a display device for displaying at least temporarily an image of the manual trace of the character performed by said finger or said tracing instrument on said input zone.

* * * * *